United States Patent
McKinnon et al.

(10) Patent No.: US 6,392,667 B1
(45) Date of Patent: *May 21, 2002

(54) METHOD AND APPARATUS FOR REPRESENTING OBJECTS AS VISUALLY DISCERNABLE ENTITIES BASED ON SPATIAL DEFINITION AND PERSPECTIVE

(75) Inventors: Bill McKinnon, Antrim; Tim Newhouse, Amherst; Eric Rustici, Londonderry, all of NH (US)

(73) Assignee: Aprisma Management Technologies, Inc., Portsmouth, NH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/871,153

(22) Filed: Jun. 9, 1997

(51) Int. Cl.[7] ............................................. G06F 16/20
(52) U.S. Cl. ........................ 345/738; 345/850; 345/854; 345/428
(58) Field of Search ................................ 345/440, 428, 345/355, 356, 357, 837, 850, 848, 734, 736, 737, 738, 713

(56) References Cited

U.S. PATENT DOCUMENTS

| | | | | |
|---|---|---|---|---|
| 5,261,044 A | * | 11/1993 | Dev et al. ................. | 345/851 |
| 5,276,789 A | * | 1/1994 | Besaw et al. ............. | 345/853 |
| 5,341,466 A | * | 8/1994 | Perlin et al. ............. | 345/428 |
| 5,504,853 A | * | 4/1996 | Schuur et al. ............ | 345/853 |
| 5,515,487 A | * | 5/1996 | Beaudet et al. .......... | 345/853 |
| 5,621,906 A | * | 4/1997 | O'Neill et al. ........... | 345/848 |
| 5,680,619 A | * | 10/1997 | Gudmundson et al. .. | 700/500.1 |
| 5,764,664 A | * | 6/1998 | Sayah et al. .............. | 707/100 |
| 5,768,552 A | * | 6/1998 | Jacoby ...................... | 345/853 |
| 5,774,130 A | * | 6/1998 | Horikawa et al. ........ | 345/441 |
| 5,781,195 A | * | 7/1998 | Marvin ..................... | 345/428 |
| 5,790,121 A | * | 8/1998 | Sklar et al. ............... | 345/853 |

(List continued on next page.)

OTHER PUBLICATIONS

Sarkar, M. et al., "Graphical Fisheye Views", Communications of the Association for Computing Machinery, v. 37, n. 12, pp. 73–84, Dec. 1994.*

Johnson, B. et al., "Tree Maps: a Space–filling Approach to the Visualization of Hierarchical Information Structures", Proc. of the IEEE Conference on Visualization '91, pp. 284–291, Oct. 1991.*

(List continued on next page.)

Primary Examiner—Kevin J. Teska
Assistant Examiner—Jeffrey Allen Rossi
(74) Attorney, Agent, or Firm—Wolf Greenfield and Sacks, P.C.

(57) ABSTRACT

Apparatus and process for consolidating the visual representation of objects into a "rollup" visual representation. A set of objects defined in an N-dimensional space and a perspective viewpoint are obtained or pre-defined. Each object in the set is then represented by a new rollup object and each new rollup object is compared with any pre-existing rollup objects to determine if it is "near enough" to any pre-existing rollup object to be consolidated with the pre-existing object. If so, they are consolidated and the new rollup object is removed. The "near-enough" determination may be made based upon a threshold minimum area of occlusion between the two rollup objects, a threshold minimum pixel distance, or a threshold minimum spatial distance between the two rollup objects. In a preferred embodiment, the rollup objects represent managed network entities (devices and/or applications) in a computer network and the rollup process provides a convenient way to consolidate information regarding a plurality of managed network entities into a subset of rollup entities which visually represent a simplified network, within a network management software application.

29 Claims, 19 Drawing Sheets

U.S. PATENT DOCUMENTS

| | | | | | |
|---|---|---|---|---|---|
| 5,812,134 | A | * | 9/1998 | Pooser et al. | 325/853 |
| 5,825,698 | A | * | 10/1998 | Brechner | 345/428 |
| 5,861,885 | A | * | 1/1999 | Strasnick et al. | 345/850 |
| 5,909,217 | A | * | 6/1999 | Bereiter | 345/854 |
| 5,910,803 | A | * | 6/1999 | Grau et al. | 345/734 |
| 6,025,843 | A | * | 2/2000 | Sklar | 345/841 |
| 6,034,697 | A | * | 3/2000 | Becker | 345/606 |
| 6,075,530 | A | * | 6/2000 | Lucas et al. | 345/804 |
| 6,111,561 | A | * | 8/2000 | Brandau | 345/781 |
| 6,237,006 | B1 | * | 5/2001 | Weinberg et al. | 345/419 |
| 2001/0045952 | A1 | * | 11/2001 | Tenev et al. | 345/428 |

OTHER PUBLICATIONS

Lamping, J. et al., "A Focus+Context Technique Based on Hyperbolic Geometry for Visualizaing Large Hierarchies", Proc. on Human Factors in Computing Systems (CHI'95), New York: Association for Computing Machinery, pp. 401–408, May 1995.*

Citrin, W. et al., "Scalable Interfaces to Support Program Comprehension", Proc. of the Fourth Workshop on Program Comprehension, IEEE, pp. 123–132, Mar. 1996.*

Xavier, Patrick, "A Generic Algorithm for Constructing Hierarchical Representations of Geometric Objects", Proc. of the IEEE Int'l. Conference on Robotics and Automation, pp. 3644–3651, Apr. 1996.*

Bajcsy, P. et al., "Uniformity and Homogenity–Based Hierarchical Clustering", Proc. of the Thirteenth Int'l Conference on Pattern Recognition, v. 2, pp. 96–100, Aug. 1996.*

Brieva, Art., "On the Prowl with WolfPack—bIf Microsoft's Clustering Software Delivers on its Promise, the Scalability and Reliability Concerns that Have Dogged NT May Disappear", Windows Magazine, issue 805, p. NT34 (reprinted 6 pages), May 1997.*

* cited by examiner

|   | X    | Y   | Z   |
|---|------|-----|-----|
| A | .25  | .25 | .25 |
| B | .75  | .25 | .25 |
| C | .25  | .25 | .75 |
| D | .75  | .25 | .75 |
| E | .25  | .75 | .25 |
| F | .75  | .75 | .25 |
| G | .25  | .75 | .75 |
| H | .75  | .75 | .75 |
| I | 1.25 | .5  | .5  |
| J | .5   | .5  | .5  |

FIG. 3

| ROLLUP OBJECT | AGGREGATE OBJECTS |
|---|---|
| 1 | E,G |
| 2 | F,H |
| 3 | A,C |
| 4 | B,D |
| 5 | J |

*FIG. 5*

METHOD AND APPARATUS FOR REPRESENTING OBJECTS AS VISUALLY DISCERNABLE ENTITIES BASED ON SPATIAL DEFINITION AND PERSPECTIVE

FIELD OF THE INVENTION

This invention relates generally to a method and apparatus for representing objects in an aggregated or consolidated manner within a defined space, and more particularly to a method and apparatus for consolidating a set of objects into one or more sets called a "rollup", based upon a spatial definition, a perspective viewpoint, and a proximity of the objects to one another.

BACKGROUND OF THE INVENTION

Certain problems become apparent when trying to represent and view multiple objects which exist within any spatial area. For example, based on the viewer's perspective, overlap and occlusion of certain objects or portions of objects in a three-dimensional space may occur with respect to other objects or portions of other objects. This overlap will prevent certain objects from being viewed in their entirety. Likewise, objects represented pictorially in a two-dimensional space may overlap each other if the predefined space is too small to arrange the objects so they may be viewed in their entirety. Finally, problems arise in trying to view moving objects in a space, since the amounts of overlap and occlusion change over time.

An example of these and other problems encountered in viewing and representing objects in space may be given using a simple example of a person viewing a flock of birds in flight. Various factors effect the viewer's perception of the flock. The spatial definition of the flock is defined by the three-dimensional volume containing the birds, the number of birds, and the position of each bird within the volume containing the flock. A perspective of the spatial definition is defined by a viewer's distance from the flock, the viewer's position in relation to the entire flock (view from underneath, off to the right or left side, etc.), and the proximity of the birds to each other within the flock. Furthermore, as the flock moves through the air, the viewer's perspective is constantly changing. Thus, if the flock were viewed from one side, it would be perceived differently from the same flock viewed from directly underneath. At times, it will not be possible to view each bird in its entirety due to overlap and occlusion of some birds by others. Finally, if the viewer were positioned a far distance from the flock, distinctions between individual birds may become less apparent and two birds may appear to touch and become one, for example.

In FIG. 1, a three-dimensional Cartesian coordinate system is shown. This is a known system for representing the positional location of an object within a three-dimensional space. The origin is labeled (0,0,0) and has values for dimensions X, Y and Z of 0, 0 and 0 respectively. The solid lines extending from the origin are labeled as the X, Y, and Z axes. The solid lines change to double lines at the point where they pass behind imaginary walls of the cube shown in the figure. Ordinarily, the X dimension measures distance left or right, the Y dimension measures up or down distance, and the Z dimension refers to front or back distance, with respect to the origin.

The X, Y and Z dimensions may have associated incremental numerical values representing distance, such as centimeters, inches, feet, miles, etc. or time in minutes, hours, seconds, etc. Various differing quantitative units and quantities of measurement can be used for the X, Y and Z axes. In FIG. 1, all of the coordinate values for points labeled are positive; however, values for dimensions can be negative as well as positive. Using this coordinate system, any single point's position within the three-dimensional space may be represented by X, Y, and Z values. The position labeled (1,1,1) in FIG. 1 represents a point in space, 1 X unit, 1 Y unit, and 1 Z unit from the origin. More importantly, point (1,1,1) "appears" to be a certain distance away from the origin (0,0,0) in the space, as observed by the viewer of the drawing. This visual perspective "appearance" occurs mainly because of the solid and double lines drawn between the various points in FIG. 1. When the solid lines become double lines, they "appear" to pass behind the walls defined by each point labeled in FIG. 1. This appearance defines an imaginary three-dimensional cube. The cube pictorially and geometrically defines an enclosed cubical area of space within the overall space of the coordinate system. When the cube is viewed on the page, its-depth and three-dimensional appearance can be seen and "imagined" by the reader.

Referring now to FIG. 2, objects A–J, represented by circles, may be pictorially inserted into the space defined by the coordinate system. The viewer can imagine the objects as being spheres, each having the same radial size, within the three-dimensional space. The center of each spherical object A–J is located at some point having X, Y and Z values. The position of the center of each object is shown by the table of FIG. 3. All of the spherical objects, except for object I, visually appear to be, and are geometrically located, within the three-dimensional space defined by the cube as shown. Object I is not within the cube area of FIG. 2 because its X coordinate, as shown in the table of FIG. 3, is 1.25. This X value places object I to the right of the rightmost plane (side) of the cube, since the four points defining this plane (1,0,0), (1,1,0) and (1,0,1) all have X coordinates of 1.

As drawn, certain objects in the figure appear to occlude parts of other objects. For example, object C appears to occlude a portion of object A. That is, object C appears to be in the foreground and object A appears to be further in the background within the three-dimensional space. Likewise, objects G, H and D appear to be in the foreground, and partially occlude objects E, F and B, respectively. If many objects were to be drawn into the figure at various locations, it is quite possible that many overlaps and occlusions would occur. Eventually, certain objects would be partially or totally obscured by foreground objects. Which objects appear occluded depends upon the perspective viewpoint of the viewer.

If the three-dimensional space shown in FIG. 2 were to be viewed perpendicular to the plane defined by points (0,0,1), (1,0,1), (1,1,1) and (0,1,1) (i.e., viewed from above), certain objects would appear obscured which were not obscured from the viewpoint shown in FIG. 2. For example, object G may partially obscure object C since object G is positioned "above" object C. Likewise, when viewed from above, objects E, F and H would partially obscure objects A, B and D, respectively. If many more objects were placed within the three-dimensional space, other objects would be partially or totally obscured from the perspective viewpoint. In a space with many objects, it becomes difficult to discern the portions of any one object from the boundaries or portions of another.

DISCUSSION OF THE RELATED ART

In prior art computer network management software applications, it is often desirable to display a pictorial representation of the computer network and its interconnected devices. An example of such software is SunNet Manager™ produced by Sun Microsystems, Inc. This product allows the manager of a computer network to view a network pictorially using graphical representations of network devices and network connections. Various views of the network may be provided to the user of the software. Oftentimes in network management software, a graphical network line will be shown connecting icons on the screen; this line represents the network. Branches or "subnets" may extend from the graphical network line. An example of such a graphical network view is shown in FIG. 6A.

In FIG. 6A, computer software (not shown) graphically displays various components of a computer network on a display 100. The image includes subnets 102–104 connected to router 101. The subnets 102–104 include network devices 105–108, 110–113 and 114–116, respectively. The view shown in FIG. 6A is an un-condensed view of the network. The lines and devices graphically represent the network architecture. A software program is able to control the actual physical network devices in response to a user manipulating the graphical representations of the devices. The graphical representations are referred to as managed objects.

The software producing the image in FIG. 6A also provides a way to consolidate the information so that a network manager (person using the software) does not have to visually "see" all of the sub-networks and their associated devices on the display at one time. This known mechanism for condensing a single subnet 102 is performed by double-clicking with a graphical pointing device, such as a mouse (not shown), on icon 109 in FIG. 6A. Icon 109 represents the point where subnet 102 attaches to router 101. When the user double-clicks on icon 109, the software redraws the image on display 100 to form a condensed image of the network, as shown in FIG. 6B. Line 118 and icon 117 graphically show a "rollup" of subnet 102. The icon 117 in FIG. 6B represents all of the devices 105–108 attached to sub-network 102 in FIG. 6A. The user is presented with a single icon 117 and an attachment line 118 representing the entire subnet and its devices attached to the router 101. The user may then un-condense the subnet by double-clicking on icon 109, to present the graphical display of FIG. 6A.

In this example of the prior art, many separate objects are replaced by a single object on the graphical display. However, the relationship between icon 117 and objects 105–108 in subnet 102 (FIG. 6A) is not based on a spatial definition or a perspective viewpoint. The relationship is based upon a predefined connectivity of the devices comprising that subnet within the network architecture. There is no spatial comparison of where one device is in relation to another at the time of the visual consolidation of the devices. Instead, predefined data structures determine how the consolidation appears. The objects are simply removed and a new one is drawn based on the data structure definition of which objects are included in the set to be consolidated. This prior art example is referred to as a "hierarchy" or "containment" structure which simplifies the representation of the subnet to the user of the software application.

All of the devices on subnet 102 are given the relationship of "belonging" in the subnet map, icon or folder represented by icon 117, before the software can produce the icon. Icon 117 itself exists as an object and is referred to as "having" or "containing" the given devices of the subnet 102. Icon 117 also has a fixed set of attributes, such as "connectivity", which are linked directly to the "connectivity" of the devices it "contains". Thus, from the user or application perspective, the devices are always viewed either as individual entities with a connectivity value as in FIG. 6A, or as an icon with a connectivity value as in FIG. 6B. The user's perspective of the icon 117 is fixed and limited since a predetermined relationship must exist between the objects represented.

Furthermore, the prior art is limited in its representation. Icon 117 may graphically represent the fact that underlying the icon, there are network devices which exist on a single subnet. Icon 117 may also indicate that each of the underlying devices are "connected" and "active" on the network. If one of the devices 105–108 represented by icon 117 were to fail in some way so as to affect the network condition, icon 117 could change color. This would indicate to the user that there may be a problem with one of the underlying sub-network devices. The operator may then un-condense the subnet icon 117, as shown in FIG. 6A, to diagnose the underlying problem.

In another version of a prior art mechanism, software for viewing objects uses the concept of a "room". In a "room" mechanism, an icon represents all of the devices contained in a hierarchy within a certain area.

In FIG. 6A, if certain network devices 111–113 attached to subnet 103 are physically located within a predefined location on the physical network, such as in a single laboratory, these objects may be combined. FIG. 6C shows an example of this, where icon 120 represents the objects 111–113. Objects 111–113 are network devices located in the same room of the laboratory, and are combined into the single icon 120. Network device 110 is not included since device 110 does not have a pre-set relationship indicating its location within the same laboratory as devices 111–113. This example is different from the previous example because it is dependent upon pre-defined relationships regarding the location of each network device. Each network device with a predetermined relationship may be combined with other devices having the same corresponding relationship. In this example, the laboratory room is the container or "predetermined set" which the relationship combination is based upon.

All of the prior art methods for combining objects are limited in various ways. For example, each of the two aforementioned methods requires predefined definitions of hierarchies or containment parameters. In these examples, each object (network device) has to be pre-associated with related objects (devices or the related network) so that when the combination occurs, the software is able to graphically condense the images of the objects (subnet and its associated devices) into a single icon. Thus, the prior art requires predetermined sets or relationships which do not take into account the spatial definition or perspective or spatial positioning of objects when viewing the graphical image of the network.

Furthermore, for a view to change in the prior art system, a condition value linked to at least one device "contained" within the combination must also change. Any device with a failure for example, may make the icon change its appearance. Thus, the value for the subnet icon changes based on device conditions and predetermined sets or relationships, rather than on perspective viewpoints and spatial relationships.

SUMMARY OF THE INVENTION

Generally, the present invention includes taking an original visual representation of any set of objects having positions within an N-dimensional space, and then, from a selected perspective viewpoint, creating a consolidated visual representation of the set of objects which may greatly simplify the view presented to the viewer, as compared with the original visual representation. The consolidation is based on the selected perspective viewpoint, the spatial interrelationships between the objects in the space, and on a user-definable near-enough relationship of when to combine two or more objects into a "rollup object." The consolidated visual representation is referred to as a "rollup representation."

In one embodiment, the present invention comprises a system for condensing a visual representation of a plurality of objects contained within an N-dimensional space. The system includes a means for determining a perspective viewpoint of the plurality of objects contained within the N-dimensional space. The perspective viewpoint is a point in space from which the objects are to be "looked at" or "viewed from". The system also includes a means for producing a rollup of the plurality of objects contained within the N-dimensional space based on a near-enough relation (the proximity) of the objects to one another from the perspective viewpoint. The rollup of the objects is a condensed, simplified visual representation of how the objects would look from the perspective viewpoint. The rollup takes into account the fact that if certain objects appear to overlap or be close to one another, they may be combined into one visual object within the rollup visual representation.

According to a method embodiment, a computer-implemented process is provided for producing a set of rollup objects from a set of objects represented in N-dimensional space. The method includes steps of selecting an object from the set of objects and determining if the selected object exists within a rollup area. If so, the process creates a new rollup object for the selected object and determines if the new rollup object is near enough to any other rollup object and if so, aggregates the rollup objects which satisfy the near-enough relation. This combines new rollup objects with existing rollup objects when they are near enough to each other from the viewpoint of the perspective. The steps are repeated until each object in the set of objects has been processed into the rollup set. In this manner, each object will be combined into a rollup object, or will be represented by a stand-alone rollup object if it is not near enough to other objects to be combined. When finished, a new visual representation may be presented which provides a consolidated view of a larger set of original objects, which are now represented by a smaller set of rollup objects, depending on the user defined near-enough relationship, the perspective viewpoint, and the spatial definition.

The invention is particularly useful in a network management application. It enables the network manager to condense the amount of information presented in a visual display of the network architecture. The view is determined based on the perspective of the viewpoint, the definition of the spatial area to be viewed (room, building, state, country, etc.), the positioning and size of the objects (network devices, connections, applications, etc.) and a definition of "nearness" selected by the viewer. The rollup mechanism provides a way to abstract the details of the network implementation which is useful in network management.

A "rollup" of objects, as defined in the present invention, refers to a consolidation of the representation of objects which exist in a two or more dimensional space into one or more sets. A rollup of a set of objects in a given space defines the objects in that space based on spatial definition, perspective of the spatial definition, and proximity of the objects in the space defined by the perspective viewpoint. A rollup consolidates how the objects in the space appear to a person or device viewing the objects from a perspective viewpoint. The principles of the present invention may be used to display objects on a computer display, for example in a "rolled-up" fashion.

These and other advantages and features of the present invention may be more particularly understood from the following detailed description.

BRIEF DESCRIPTION OF THE DRAWINGS

FIG. 3 is a table for the object set of FIG. 2, listing each object's positional coordinates;

FIG. 5 is a table of rolled-up object sets for the example of FIG. 4;

DETAILED DESCRIPTION

Figure 9:
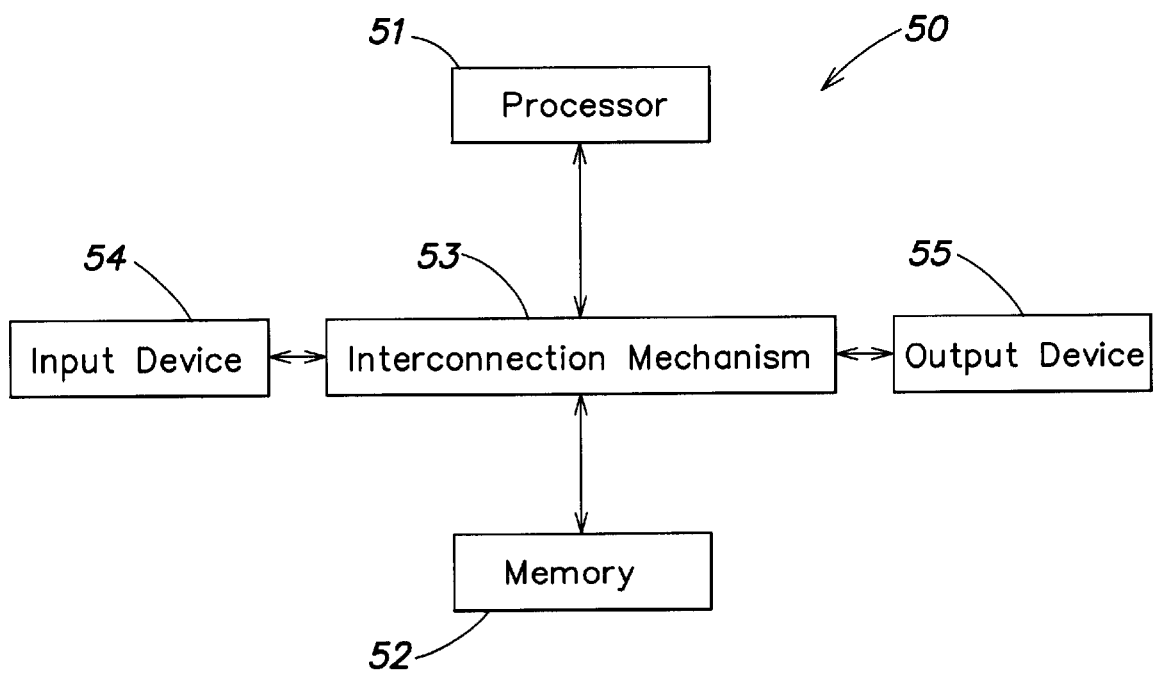
FIG. 9 is a schematic illustration of a computer apparatus.

In accordance with one embodiment, the present invention may be implemented using a digital computer. A typical computer system 50 is shown in FIG. 9, and includes a 4 processor 51 connected to a memory system 52 via an interconnection mechanism 53. The interconnection mechanism is typically a combination of one or more buses and one or more switches. An input device 54 and an output device 55 are also connected to the processor and memory system via the interconnection mechanism.

It should be understood that one or more input devices 54 and output devices 55 may be connected to the computer system 50. Example output devices include a cathode ray tube (CRT) display, liquid crystal display (LCD), printers including color laser copiers, communication devices, network interfaces such as a modem or ATM or Ethernet card, and audio output. Example input devices include a keyboard, keypad, trackball, mouse, pen and tablet, communication device, disk drive, video input, digital camera, and image scanner. Furthermore, embodiments of the invention may obtain input from devices remotely located on computer networks of many different types. It should be understood that the invention is not limited to the particular input or output devices used in combination with the computer system, or to those described herein. The input and output devices may be included within or external to a main unit which typically houses the processor 51, memory system 52 and interconnection mechanism 53.

The computer system 50 may be a general purpose computer system, which is programmable using a high-level computer programming language, such as "C++." The computer system may also be implemented using specially programmed, special purpose hardware. In a general purpose computer system, the processor is typically a commercially available processor, such as the Pentium microprocessor from Intel Corporation, PowerPC microprocessor, SPARC processor, or 68000 series microprocessor. Many other processors are available. Such a processor usually executes a program called an operating system, e.g., the Windows and DOS operating systems available from Microsoft Corporation, or the Unix operating system available from Sun Microsystems, Inc. and AT&T; the operating system controls the execution of other computer programs and provides scheduling, debugging, input-output control, accounting compilation, storage assignment, data management, memory management, and communication control and related services. The processor and operating system define a computer platform for which application programs in high-level programming languages are written. It should be understood that this embodiment of the invention is not limited to a particular computer platform, particular operating system, particular processor, or particular high-fevel programming language. Additionally, the computer system 50 may be a multi-processor computer system or may include multiple computers connected over a computer network.

A preferred embodiment described herein uses a general purpose computer, and software which is programmed in an object-oriented computer programming language such as C++, to process steps which implement the present invention. The computer is used to manipulate data which represents software objects, in a three-dimensional space.

Figure 1:
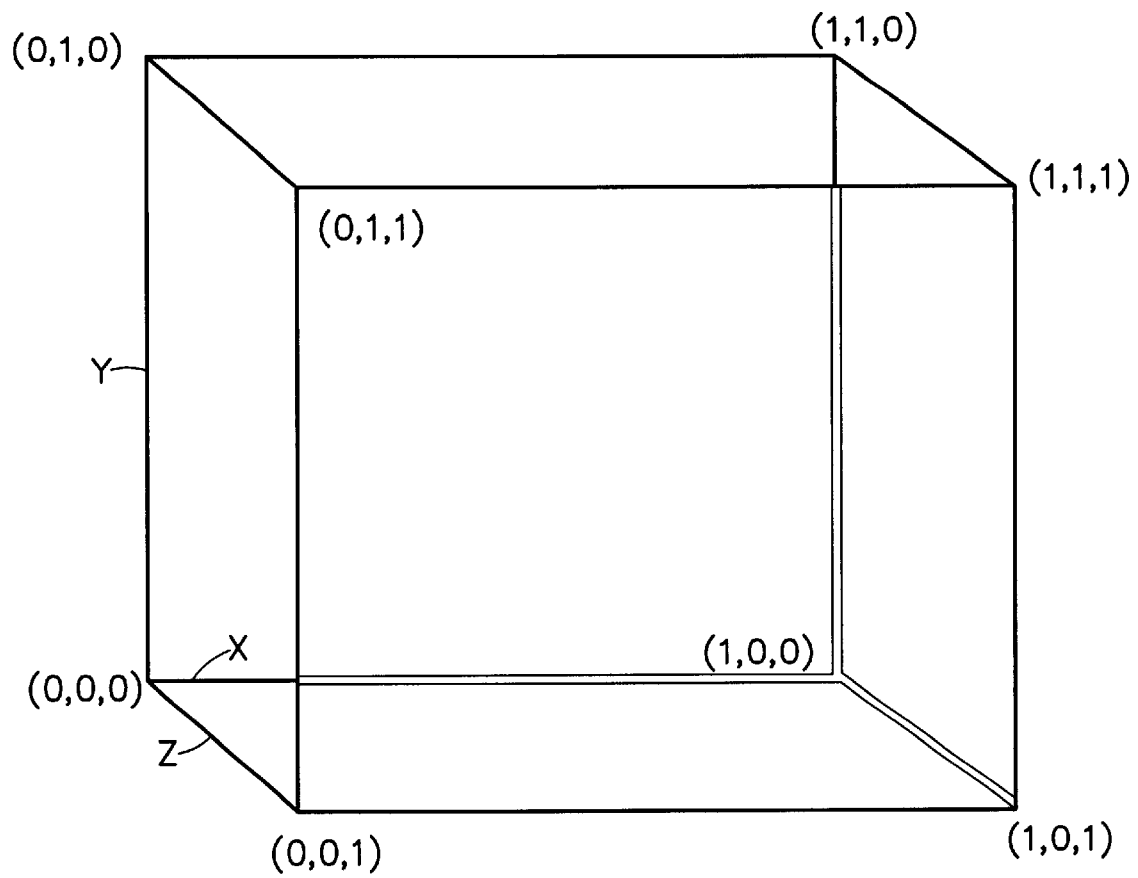
FIG. 1 is an illustration of a three-dimensional space defined in a Cartesian coordinate system.
Figure 2:
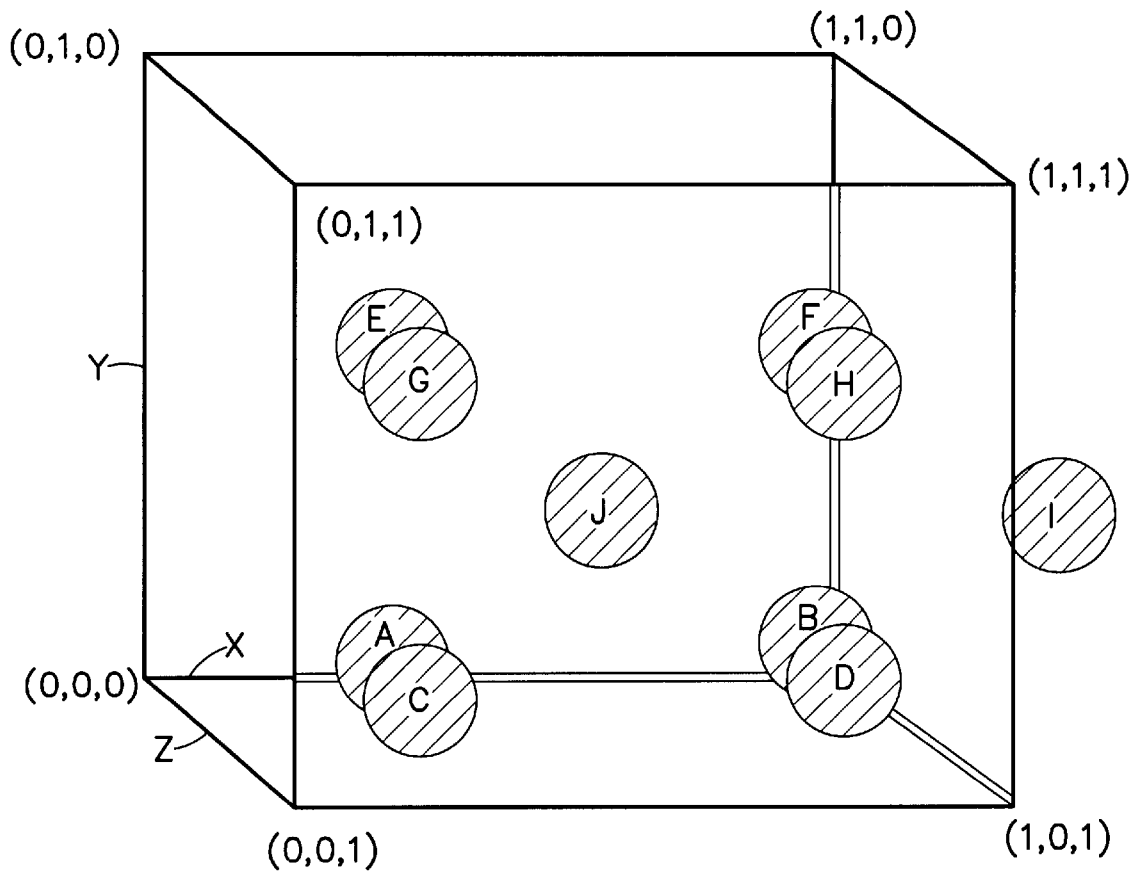
FIG. 2 shows a set of objects, some within and one outside the space of FIG. 1.

FIG. 1 illustrates a spatial definition based on eight points (0,0,0), (0,0,1), (0,1,1), (0,1,0), (1,0,1), (1,1,1), (1,1,0), (1,0,0) which form the boundaries of an imaginary cube. FIG. 2 shows spherically-shaped objects A–H and J which are physically located inside the spatial definition of the cube, as well as object I which is physically located outside of the boundaries of the cube. The coordinate center position of each object A–J, in relation to the origin point (0,0,0), are shown by the table in FIG. 3. In embodiments of the present invention, this table may be represented by a data structure suitable for data of this type. A suitable data structure used on a general purpose computer would be known to those skilled in the art and may consist of a linked list, array, binary tree, stack, etc., or combinations thereof.

The rollup method and apparatus of the present invention allows the objects A–J within the 3-dimensional space of FIG. 2, to be "rolled up". Objects which "appear" to overlap based on the perspective viewpoint of the viewer are aggregated or condensed into one object which represents the rollup of the condensed objects. The viewer is thus presented with less information to process, and is given enough information to know that objects exist "within" the rollup objects. It is important to note that a rollup according to the present invention may appear differently, for the same stationary objects in the spatial definition, depending on the perspective viewpoint.

Figure 4:
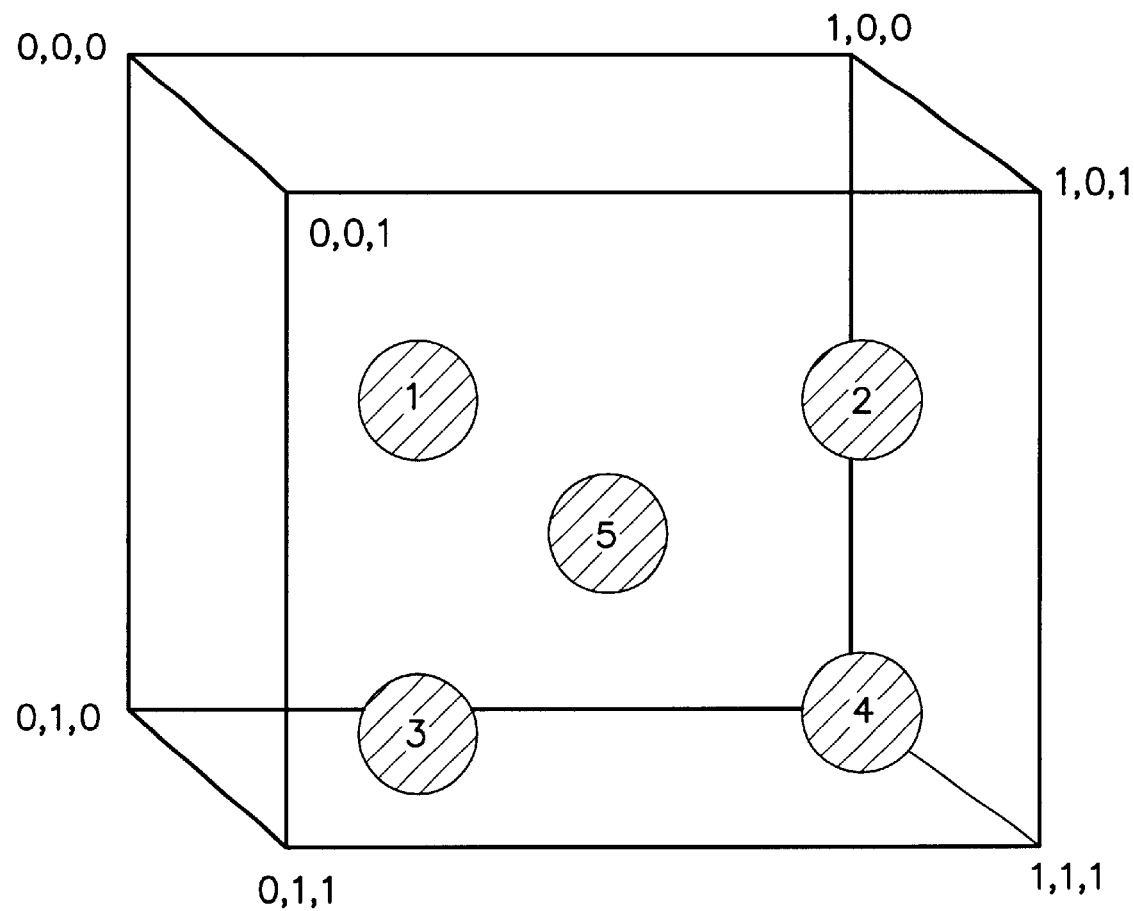
FIG. 4 is one example of a visual display of "rolled-up" objects based on the object set of FIG. 2, wherein a spatial definition and perspective view are defined according to the present invention.
Figure 6A:
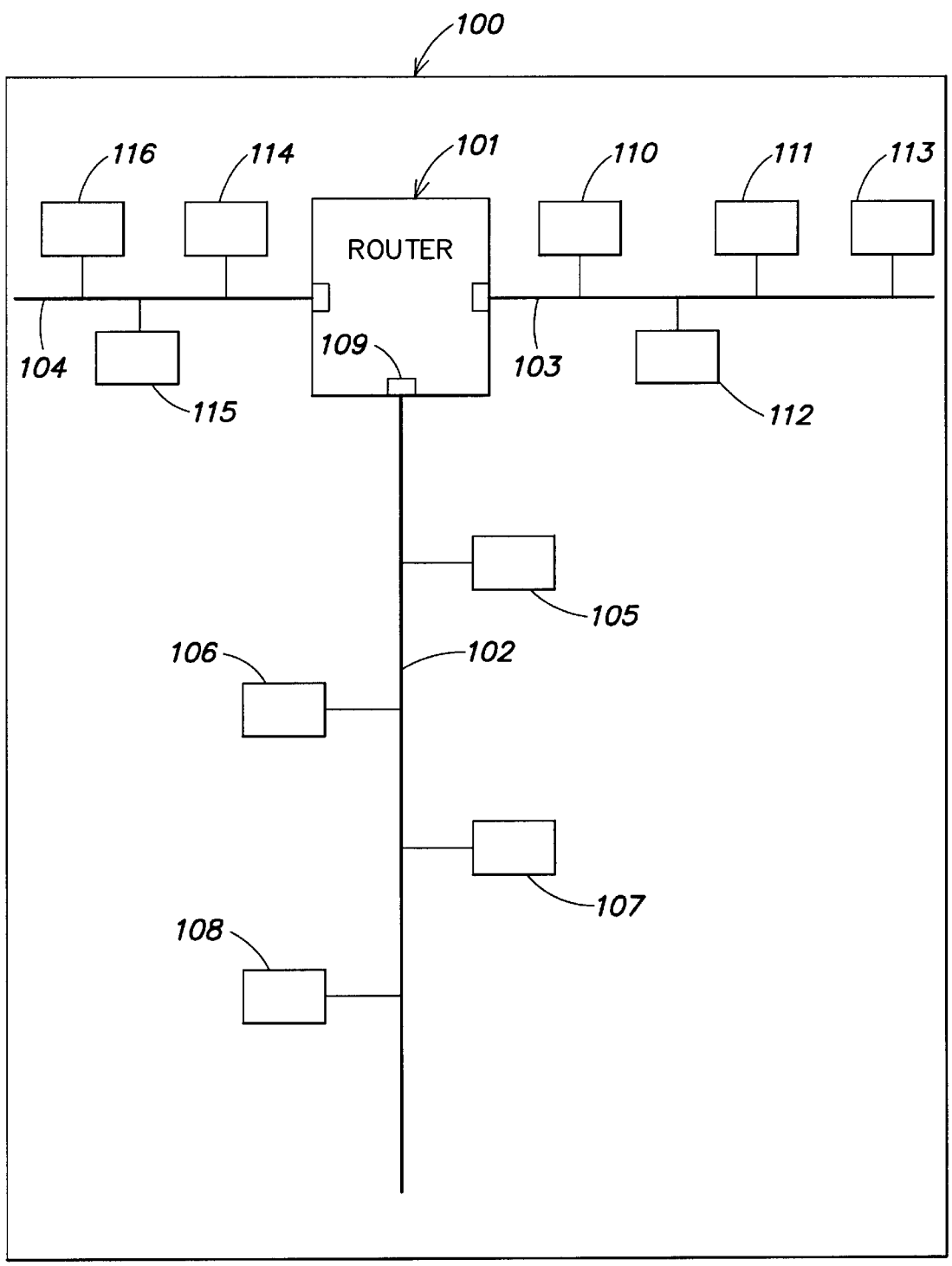
FIG. 6A shows a prior art screen display from a graphical-based network management application showing a network in a non-condensed state.
Figure 6B:
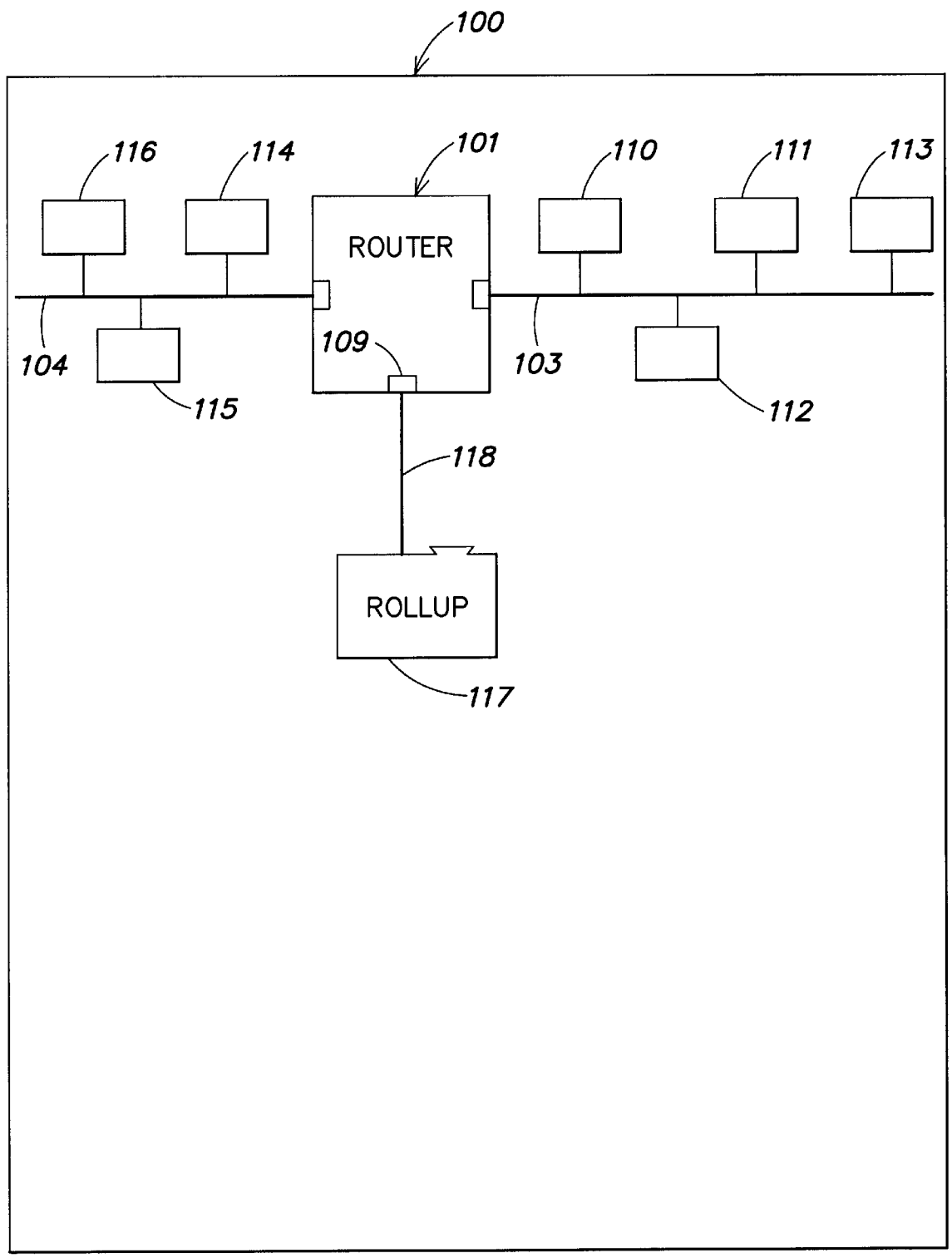
FIG. 6B shows a prior art screen display similar to FIG. 6A but having one subnet in a condensed state based upon connectivity characterizations of the devices within the rollup.
Figure 6C:
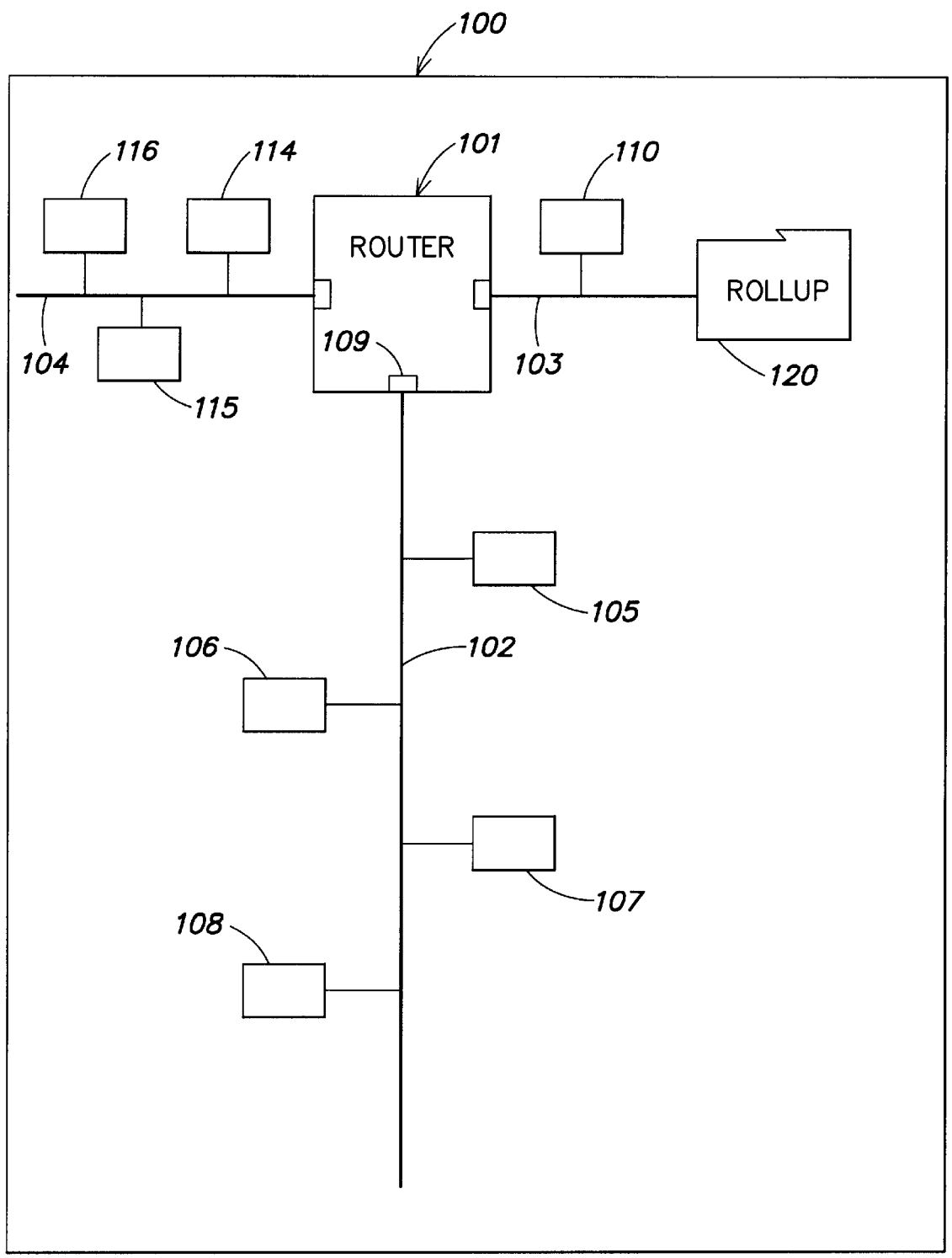
FIG. 6C shows a prior art screen display similar to FIG. 6A but having one subnet "rolled up" based on location characteristics of the devices, referred to as a "room" rollup.

For a better understanding of the rollup concept according to the present invention, FIG. 4 shows a potential rollup from the perspective viewpoint of a viewer of FIG. 2. In FIG. 4, rolled-up objects 1–5 are shown within the three-dimensional space defined by the same cube of FIG. 2. In this embodiment, only the area within the predefined cube is actually "rolled up". Object I from FIG. 2 does not appear in the "rollup". The present invention thus provides a way to selectively define an area to be "rolled up", i.e., the spatial definition, and may exclude certain other areas, if desired.

Another observation from FIG. 4 concerns the number of objects within the "rolled up" space. In FIG. 2, nine distinct objects A–H and J are shown within the cube. However, in FIG. 4, only five rollup objects 1–5 remain. Rollup objects 1–5 represent all nine of the objects A–H and J, obscured or non-obscured, which existed in space from the perspective viewpoint of FIG. 2. Object 1 in FIG. 4 is the rollup of objects E and G of FIG. 2, because from the perspective viewpoint of FIG. 2, object G partially occludes object E. Likewise, objects 2, 3 and 4 in FIG. 4 are rollup objects corresponding to object pairs (F,H), (A,C) and (B,D), respectively.

In the present invention, a viewer may or may not want, or need to know, how many objects are actually represented by a rollup object. The attributes and properties of the underlying objects can if desired be rolled up and become part of the rollup object. This provides a convenient method for encapsulating information concerning multiple objects which may have too much information to be understood when viewed separately.

Another feature regarding the rollup in FIG. 4, is that object J of FIG. 2 has a corresponding rollup object 5 in FIG. 4. From the perspective viewpoint of FIG. 2, no other object obscures object J. When the rollup area defined by the cube in FIG. 2 is rolled up, rollup object 5 is produced and corresponds exactly to only object J of FIG. 2. This rollup object 5 may be identical to object J of FIG. 2, since the rollup operation of the present invention did not need to consolidate any information about object J. It is noted, however, that the present invention may provide a way to further consolidate information regarding an individual unobscured object when it is represented in its rolled up form, and this example is not meant to be limiting.

FIG. 5 shows a table which represents the relationships between the rolled-up objects of FIG. 4 and the un-rolled up (unaggregated) objects of FIG. 2. This rollup table depicts the sets of individual objects incorporated into each single rollup object. As will be described, the present invention derives the rollup objects from the spatial definition of the rollup space, the perspective viewpoint of the viewer, and the proximity of objects within the space to be rolled up.

In order to perform a rollup, data representing the objects, the perspective viewpoint, and the spatial definition are used. In one embodiment, the rollup service generally stands alone. That is, the rollup service needs no knowledge of how or where the above data has been obtained. This embodiment provides an object-oriented design and presentation of a rollup service for any type of object data in any type of spatial definition. However, in subsequent embodiments, the rollup service may be tightly bound and integrated to other functionality of a system. Thus, it may incorporate mechanisms for actually obtaining the object data, spatial definition, and perspective information, as well as mechanisms for rolling up the data and rendering the rollup information as output. For the present embodiment however, and to keep the description clear, it will be assumed that object data, spatial definition, and perspective are predefined, such as in a data structure, before the rollup service is utilized.

In the present example, each object's position and size are known (see FIG. 3), as well as the spatial definition of the area to be rolled up (the imaginary cube area in FIG. 2, known as the rollup area). The perspective viewpoint in this example is a point in space any distance away, and at any location around or within, the rollup area. In the example of FIG. 2, the perspective viewpoint (not shown) is located at a point whose coordinates would be approximately (−1, 1.5, 5). This represents where the viewer is located in space, in relation to the objects that are being viewed. The viewer of the image in FIG. 2 is slightly backwards in the X direction from the objects A–J, with X about equal to −1. The viewer is also slightly above the "top" face of the cube, with Y about equal to 1.5. And finally, the viewer is spaced away from the face of the page (from the front face of the cube), by approximately 5 Z units. From this perspective viewpoint, the objects appear as shown in FIG. 2. From that point in space, the objects C, D, H and G somewhat occlude the full view of objects A, B, F and E. Thus, this example perspective viewpoint places the viewer, or a device which is viewing the objects, somewhat in front of the foremost face of the cube, i.e., the face defined by points (0,1,1), (1,1,1), (1,0,1) and (0,0,1).

A description of the processing needed to perform a rollup of the objects as shown in FIG. 2 will now be given. The following processing steps may be performed by a general purpose computer, once the values defining the spatial definition, the perspective viewpoint, and the position and size of the objects within the spatial definition are known. The method and apparatus for performing the rollup of the objects in FIG. 2 will be given with reference to pseudocode. The pseudocode provides a generic set of instructions which allow a general purpose computer to roll up objects represented in a space. The instructions given in the pseudocode are not meant to be limiting. Likewise, modification may be made to the processing which will not readily effect the overall nature of the present invention. That is, this embodiment of the present invention represents the nature of the processing performed, and is not specifically limited to these instructions in this order. In the pseudocode itself, the lines beginning with "//" indicate commentary on the processing which will take place at that point in the code. The remaining lines of the pseudocode reflect the general processing performed by the general purpose computer. The NearEnough pseudocode is a sub-routine which is called by the Rollup Service routine. Reference is now made to the pseudocode for a Rollup Service routine, as well as the flow charts of FIGS. 7 and 8, which parallel the steps in the pseudocode:

```
Begin NearEnough
    // NearEnough has the following data obtained from the
        RollupService.
        RollupArea of type AreaDefinition
        CurrentPerspective of type Perspective
        SetOfObjectsOne of type ObjectSet
        SetOfObjectsTwo of type ObjectSet
    // NearEnough has the following data which is config-
        urable from the
    // RollupService or the requester of the RollupService.
        DefinitionOfNear of type PercentOfAreaOccluded
    // NearEnough returns a TRUE or FALSE value depend-
        ing if it determines
    // that the two input SetOfObjects are "near enough" to be
        considered as
    // one set.
    // Map each input set into an Area. Do this by creating an
        Area object
    // using the coordinate system from RollupArea and the
        contents of each
    // SetOfObjects.
        AreaOne.Create(RollupArea, SetOfObjectsOne)
        AreaTwo.Create(RollupArea, SetOfObjectsTwo)
    // Now see if from the given perspective the two areas are
        "near enough".
    // The PerspectiveOverlap helper service determines the
        amount of occlusion
    // between AreaOne and AreaTwo as mapped from the
        CurrentPerspective. If
    // the amount of area occluded is equal to or greater than
        the DefinitionOfNear
    // value then it returns TRUE, else it returns FALSE.
        if PerspectiveOverlap(AreaOne, AreaTwo,
            CurrentPerspective, DefinitionOfNear) return
            TRUE;
        else
            return FALSE;
        end if
End NearEnough
Begin RollupService
    // RollupService has the following data obtained from the
        requestor of the
    // RollupService.
        SetOfObjects of type ObjectSet
        RollupArea of type AreaDefinition
        CurrentPerspective of type Perspective
        ValueExpression of type ExpressionForApplyingToA-
            SetOfObjects
    // RollupService returns the following data to the
        requestor.
        RollupObjects of type SetOfObjectSet
        ExpressionValues of type SetOfValueFromExpression
    // RollupService has a helper routine (above) to determine
        if objects are near
    // enough.
        extern NearEnough(AreaDefinition, Perspective, SetO-
            fObjects One,
        SetOfObjects Two)
    // Clarify that nothing has been RolledUp yet by initial-
        izing rollup set.
        RollupObjects.initialize
        ExpressionValues.initialize
    // Begin performing the RollupService. Each object is
        rolledup based on how it
```

```
// is positioned in the area and how it is positioned with
    other objects in that area.
// Apply perspective. The closer an Object is to the
    Perspective (in units of the
// RollupArea) the more weight it is given in the RollupSet
    by the order in which
// it is evaluated in the RollupArea.
    SetOfObjects.Sort( ascending, by_proximity,
        Perspective, RollupArea)
// Must consider each Object being "Rolled-Up" individu-
    ally.
for each Object in SetOfObjects
// If objects are not within the defined area then they are
    not included in any
// response from the RollupService.
    if RollupArea.Intersects(Object.Location) then
        // Give each object a chance to exist in its own space.
        NewRollupObject.Create( Object)
        // See if the Object is "positionally equivalent"
// to any RollupObject already created.
    for each RollupObject in RollupObjects
        if NearEnough(RollupArea, CurrentPerspective,
            RollupObject, NewRollupObject) then
            RollupObject.Assimilate( NewRollupObject)
        end if
        delete NewRollupObject
    next RollupObject in RollupObjects
// If the object did not get put into another RollupObject
    then add it to the set
// of RollupObjects being created by this Service.
    if exists( NewRollupObject) then
        RollupObjects.Add( NewRollupObject)
    end if
end if
next Object in SetOfObjects
// A RollupObject is a set; on this set any
// ExpressionForApplyingToASetOfObjects expression
    can be applied.
// In this example the RollupService is providing the
    capability
// to get a single value for each RollupObject being
    created.
for each RollupObject in RollupObjects
    ExpressionValues.Add
        (RollupObject.EvaluateExpression
        (ValueExpression))
    next RollupObject in RollupObjects
// Return the RollupObjects and their values (as asked
    for).
    return( RollupObjects, ExpressionValues)
End RollupService
```

In this example, we assume a set of objects A–H and J exists within a spatial area defined by the imaginary cube (shown by the solid and double lines) in FIG. 2. The area enclosed by the cube, known as the rollup area, is a subset of the entire spatial area, and is equal to only the space encompassed by the eight cube corners. Object I also exists in the space of the entire set of objects A–J, but is outside of the boundaries of the rollup area. We further assume data, which represents these objects and the spatial area containing the objects, exists within one or more data structures in a general purpose computer. To perform a rollup of these objects, from any perspective viewpoint, the Rollup Service routine as shown in the pseudocode may be called. A calling program (not shown in any figure), referred to as a client program, "calls" the Rollup Service routine to perform the rollup processing on these objects.

Figure 7:
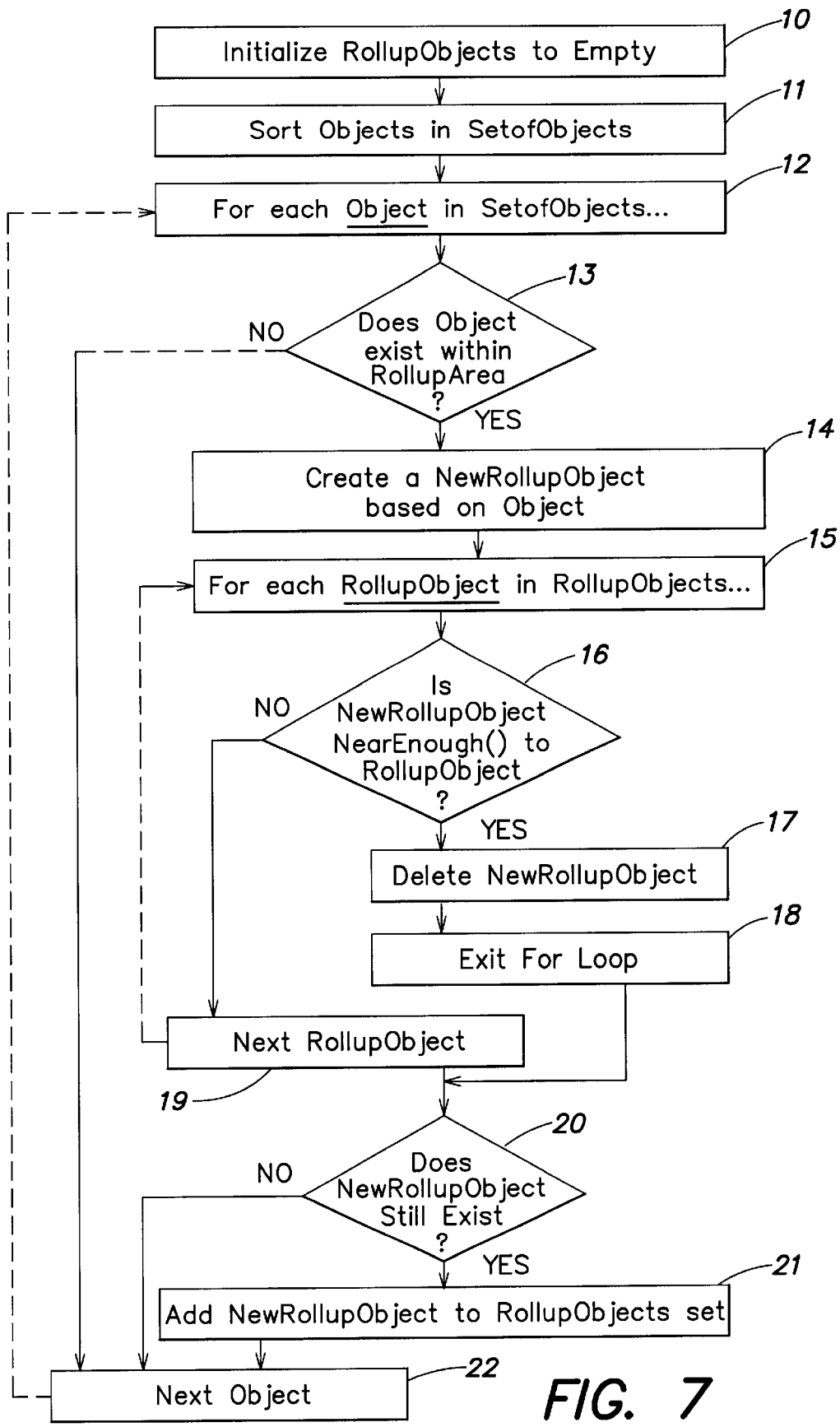
FIG. 7 is a flowchart of the rollup service method of the present invention.
Figure 8:
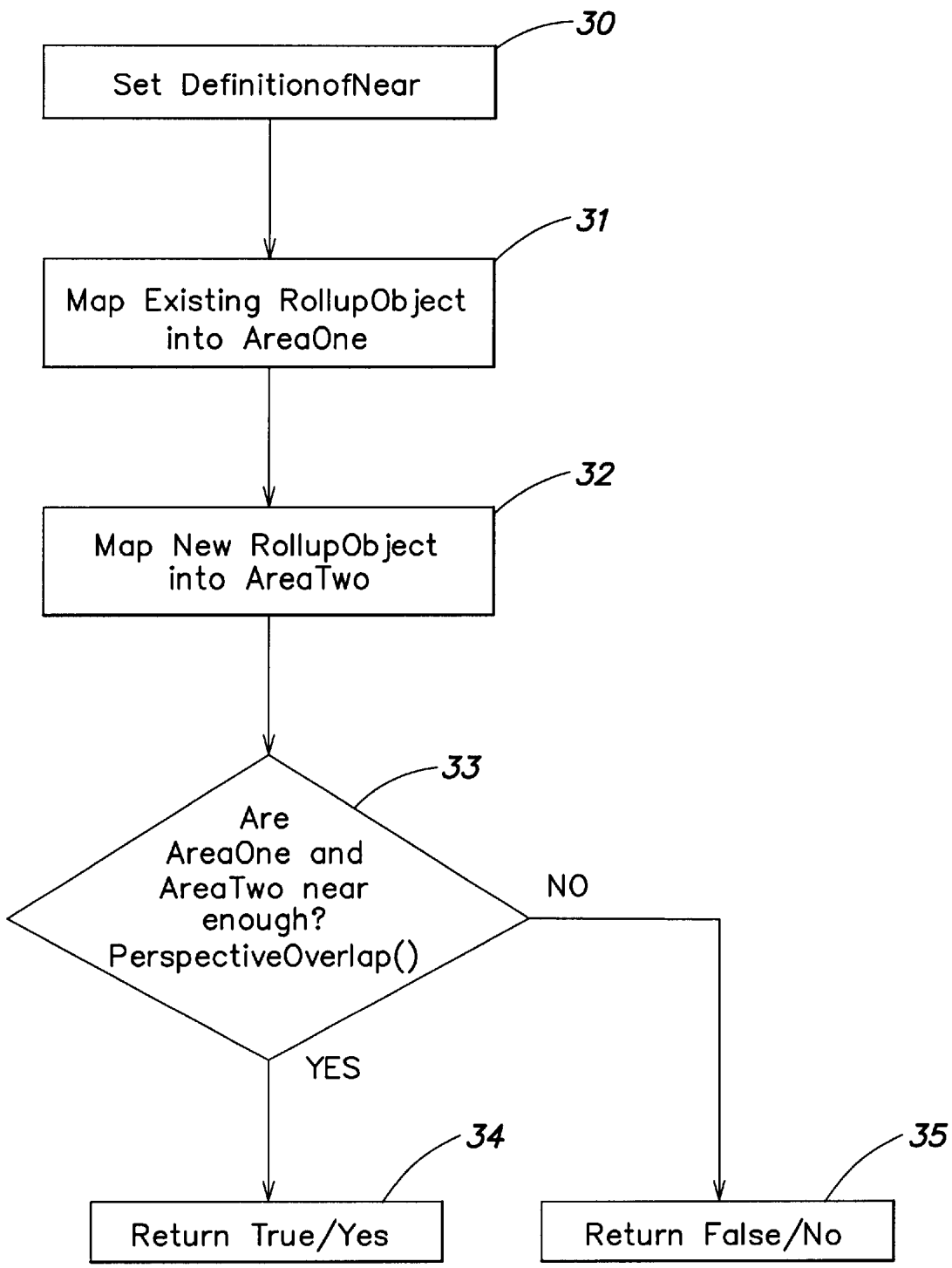
FIG. 8 is a flowchart of a "near enough" subroutine utilized in the method of FIG. 7.

FIGS. 7 and 8 are flowcharts which illustrate the above. FIG. 7 shows the general nature of the steps involved in the Rollup Service routine. FIG. 8 shows the general nature of the steps involved in the NearEnough sub-routine, which is called by the Rollup Service routine.

When the Rollup Service routine is called, it receives the following parameters from the requester of the Rollup Service: SetOfObjects, RollupArea, CurrentPerspective and ValueExpression. SetOfObjects is a data structure or a pointer to a data structure which contains the object positions and sizes. RollupArea is the spatial definition of the area to rollup objects within. In this example, RollupArea may contain the points encompassed by the cube of FIG. 2. CurrentPerspective is the X, Y and Z coordinates for a single point which is used as the perspective viewpoint when performing the rollup on the objects in SetOfObjects. The final parameter, ValueExpression, is a parameter which can alter the rollup objects after they are rolled up, as will be described later.

Next in the pseudocode, the Rollup Service routine defines RollupObjects. This is a set of objects which the Rollup Service routine will return to the calling program after the rollup has been completed. The NearEnough routine is also defined and will be described later. The parameters are shown in the pseudocode for clarity. Those skilled in the art will recognize that other parameters and other known mechanisms, such as Direct Memory Access (DMA), may be used to access data without deviating from the scope of the invention.

After the parameter declarations, the first processing step in the pseudocode is to verify that the rollup set RollupObjects is empty. Variable initialization is shown as step 10 in the flowchart of FIG. 7. Other variables may also be initialized at this time without departing from the scope of the invention. Likewise, it may be desirable to not initialize certain data values at this point. Though the mechanisms are shown, they are not meant to be limiting.

Next, the objects in the SetOfObjects data structure (e.g., the objects to be rolled up) may be sorted. This is step 11 in FIG. 7. In this embodiment, the objects are sorted in an order determined by the linear distance of each object from the perspective viewpoint CurrentPerspective (the coordinate position of the person or device viewing the objects). This sort processing is done in the pseudocode by calling a SetOfObjects.Sort routine. The steps within this sort procedure are not shown in the above pseudocode. This routine sorts the objects into an order arranged from the closest object distance to the farthest object distance from the perspective viewpoint. The objects remain in the SetOfObjects data structure in a sorted fashion after calling this sort routine.

Other sorting methods may be used. The sorted object order effects the way the rollup is performed. For instance, if the objects are sorted in reverse order based on object distance from the perspective, then the farthest objects from the perspective viewpoint would be rolled up together first, and the closer objects would be compared and added to the rollups already existing, as will be explained. The present invention is not limited to a specific sorting method.

The purpose underlying the SetOfObjects.Sort process in the pseudocode, and step 11 in FIG. 7, is based on the spatial relationship between all of the objects within the RollupArea. By sorting the existing objects into an order ranging from closest to farthest away from the perspective point, at rollup object creation time, precedent may be given to the non-rolled up objects that exist in the foreground of the space, relative to the perspective point. This may be important, since objects which are closer in distance to the perspective coordinate point will occlude more distant objects. Thus, if all of the objects are ordered based on their distance from this point, as they are rolled up, the closest rollup objects are maintained in view, while the farther objects will get "placed" into a rollup of closer objects. The foregoing will become apparent as the rollup processing is described in more detail.

In an alternative embodiment, the sorting processing may not need to be performed by the Rollup Service routine. In such an embodiment, software which is used to represent network devices for example, may present a set of objects to the rollup service in a predefined order. In such a case, it may be desirable to let the client application process, which calls the Rollup Service, determine the order in which objects are rolled up, and thus sorting would be unnecessary.

In the present embodiment, after object sorting, a processing loop is entered in step 12 of FIG. 7. The general nature of processing in this loop (steps 12–22) selects each object individually within the SetOfObjects data structure and then checks to "see" if this object should be rolled up with other objects. This loop is entered when the looping statement "for each Object in SetOfObjects" is encountered in the pseudocode. Within this loop, in step 13 the processing determines if the selected object (Object within SetOfObjects) of the current loop iteration exists within the geometrical boundaries of the defined rollup area (RollupArea). This is achieved with a call to the RollupArea.Intersects (Object.Location) statement. In this example for the set of objects shown in FIG. 2, when RollupArea.Intersects is called with object I as a parameter, processing skips the remainder of the loop and goes to step 22. Object I is skipped because it physically resides outside of the geometrical boundaries of the space defined as RollupArea. Thus, in this embodiment, only the objects within the rollup area are considered when performing a rollup.

Determining if each object is within the rollup area space is not meant to be limiting. Other possible embodiments which roll up objects may skip step 13. In such embodiments, the concept of a limited rollup area may be irrelevant. The processing rolls up all objects which exist anywhere in RollupArea, which is equal to the whole space. The calling procedure passes the entire spatial definition into the Rollup Service Routine as the RollupArea parameter. Under these circumstances, all objects in the data structure SetOfObjects may be rolled up, regardless of their location since the RollupArea encompasses the whole space, and thus all the objects.

In the present embodiment which only selects objects in the rollup area, if step 13 in FIG. 7 produces a true (yes) response, the Rollup Service routine loop is now "operating" on an object within the spatial area to be rolled up. Next, in step 14, a new rollup object (NewRollupObject) is created for the object of the loop iteration. The characteristics of this new rollup object are based on the object which existed within the RollupArea (e.g., the object to be rolled up). This new rollup object is created by a call to the routine NewRollupObject.Create (Object) in the pseudocode. At creation, each new rollup object data structure may contain copies of properties which relate to the object which it represents. For example, the new rollup object (RollupObject) may contain the positional coordinates of the object (Object) which it is replacing. Other characteristics of the object may be recorded in the new rollup object, such as a record of the original coordinate position, size and shape of the object which it represents. Certain parameter values relating to the status, for example, of a network device object may also be copied into the new rollup object data structure. This information, stored in the new rollup object, may be used later to "un-rollup" a rollup object into its constituent objects in future processing steps. The new rollup object stores this information to re-create the non-rolled up view of objects, should the user or processing desire to do so.

In the next set of processing steps, the existing set of rollup objects maintained in the data structure "RollupObjects" (which is empty on the first loop iteration), are examined to "see" if the newly created rollup object (NewRollupObject) is "positionally equivalent" to any other rollup object already created. To perform this processing, another loop is entered at step 15 in FIG. 7, corresponding to the pseudocode statement "for each Rollup Object in RollupObjects". Generally, this second loop determines if the newly created rollup object is within a predefined "rollup distance" of another rollup object in the set of already existing rollup objects. The processing "asks" the question: "Is the newly created rollup object 'near enough' to a pre-existing rollup object, such that it should be rolled up into the pre-existing rollup object?" This 'near enough' determination is made by a call to the processing routine called NearEnough, and is shown in step 16 of FIG. 7.

The NearEnough subroutine pseudocode is listed above and its general processing steps are shown in the flowchart of FIG. 8. Generally, NearEnough returns a true (yes) or false (no) value. The return value depends upon if the new rollup object (NewRollupObject) is so close to any of the other rollup objects (RollupObject in SetOfRollupObjects), which have already been created, as to not warrant the new rollup object's existence. If two objects in space occlude, overlap, or are close enough to one another from a given perspective, then there is no need to have both objects; this is one of the principles on which the present invention is based.

Each new rollup object, when first created, represents only one object. The rollup of all objects reduces the amount of visual information displayed. Therefore, a new rollup object may not be needed if the new rollup object may be visually and spatially represented by another, pre-existing rollup object. The pre-existing rollup object must be close enough (near enough) geographically to the position of the new rollup object, from the visual perspective of the viewpoint of the set of objects, so that the pre-existing rollup object may take the place of, or serve to represent, the new rollup object. This is how one rollup object may represent multiple un-rolled up objects. This determination is accomplished by "looking" at the newly created rollup object in comparison with each of the existing rollup objects (RollupObject) that have already been created in the rollup area (RollupArea). This processing begins at step 15 in FIG. 7.

The NearEnough routine is called within a conditional "if statement" at step 16. In each loop iteration, each existing rollup object (RollupObject) in the set of rollup objects (RollupObjects) will be compared with the new rollup object (NewRollupObject), to see if the existing object may adequately represent the new object just created. The loop effectively determines if they should be combined or not. This comparison may be made based on the spatial definition of the RollupArea, the objects position and size, and the perspective viewpoint. Other factors such as DefinitionOfNear may be used as well, as will be explained.

Upon entry into the NearEnough routine, NearEnough obtains RollupArea, CurrentPerspective, SetOfObjectsOne and SetOfObjectsTwo as parameters. These steps of receiving the parameters are shown in the pseudocode but not in the flow chart in FIG. 8. The contents of RollupArea and CurrentPerspective have already been defined. SetOfObjectsOne and SetOfObjectsTwo are object sets, having values corresponding to the existing rollup object, and the newly created rollup object, respectively. SetOfObjectsOne may be equivalent to the rollup information of many objects. SetOfObjectsTwo may be equivalent to an object set having only the newly created rollup object (NewRollupObject). These two object sets will be compared to determine if they occlude, overlap, or are close enough, with respect to the perspective viewpoint location.

Once NearEnough obtains these four parameters, processing next defines the variable DefinitionOfNear. DefinitionOfNear may be defined by parameters which can be predefined by the software system. In this pseudocode example, DefinitionOfNear is set to be type PercentOfAreaOccluded. This step is shown as step 30 of FIG. 8.

The predefined data type PercentOfAreaOccluded may consist of numerical values that determine how much of an object must be occluded by another object to trigger a rollup of those two objects into a single rollup object. However, the invention is not limited to this type of indicator. Alternative embodiments may use an indicator that signifies that two objects are occluding one another from a perspective viewpoint by determining the amount of perceived space the objects have in common with each other. This may be determined by performing an intersection calculation of the area of two objects.

Likewise, in another embodiment of the present invention, screen pixel relationships between managed objects in memory may be used to determine the amount of overlap, occlusion, or closeness of two objects on a computer display. Furthermore, the definition of how "near" may also be based on a threshold distance. In an embodiment using closeness as the criteria to determine when to rollup objects, actual occlusion or overlap of objects from the perspective viewpoint may not be needed. Objects may just be "close" to one another for them to be rolled up. The DefinitionOfNear thus defines the criteria that will determine when a threshold value has been reached, which then determines when two objects should be rolled up with one another.

Once DefinitionOfNear has been set, each input object (SetOfObjectsOne and SetOfObjectsTwo) is mapped into an area in steps 31 and 32 of FIG. 8. This is done in the lopseudocode by creating two area objects, AreaOne and AreaTwo, using the coordinate system from the RollupArea parameter and the contents of the pre-existing rollup objects for AreaOne and the new rollup object for AreaTwo. The cross-sectional area "seen" as the object from the perspective viewpoint, may be computed, for example by geometry, by knowing the radial size of the object, its coordinate position, and the coordinate position of the perspective viewpoint. After the area computations are computed, the determination may be made, based on the given perspective, the two areas, and the "definition of near", if the two object areas are "near enough" to trigger rolling up. A call is made to a routine called PerspectiveOverlap, within step 33 of FIG. 8, to carry out the processing to make this decision.

PerspectiveOverlap determines the amount of occlusion, overlap, or closeness between AreaOne and AreaTwo. The calculation may be based on the two areas, the current perspective (CurrentPerspective) and the definition of "near" (DefinitionOfNear). For example, DefinitionOfNear may contain a value such as 100 pixels. PerspectiveOverlap may measure the distance between each object area in the geographical plane which is perpendicular to the perspective viewpoint. This distance corresponds to the distance each object is apart from one another on a computer screen. If this distance were less than the 100 pixels defined by DefinitionOfNear, based on the current perspective, PerspectiveOverlap may return true and the objects may be rolled up.

In other embodiments, the invention may provide a way to define a "density" that the spatial rollup area may not exceed. If the density is exceeded, newly added objects are rolled up into existing rollup objects. In such an embodiment, for example, if there were only two objects in the entire spatial area, and there was no occlusion of either one from the current perspective viewpoint, but the objects were within the DefinitionOfNear value for "density" which exceeded a density value, then a roll up would occur. This roll up may occur, even though there is no actual overlap or occlusion. Thus, the NearEnough routine provides a way to determine if two objects should be rolled up, but allows the deciding factors used in making this decision to be controllable by the user of the system via the definition of "near".

In another embodiment, the PerspectiveOverlap processing may determine object overlap by creating a vector between the perspective viewpoint coordinate and the center coordinate of each of the two objects being compared in NearEnough. Then, to determine the overlap or occlusion or closeness of the objects, object size may be used as well. The distance between these two vectors, measured by a factor such as the angle formed between the two vector lines, may be used to determine the true or false value returned by the PerspectiveOverlap routine. If the angle formed between the center of the two areas (objects) and the perspective viewpoint was below a threshold value defined in DefinitionOfNear, then the objects may be deemed to be sufficiently "close" to warrant rolling up.

The description of the present invention's mechanisms which determine the "closeness" of two objects in space based on a perspective viewpoint is not meant to be limiting. In the examples described, angles, pixel overlap and area occlusion mechanisms were used. Other mechanisms known to those skilled in the art for determining closeness between two objects based on a perspective viewpoint may also be used to allow a rollup of those objects to occur. These other methods and apparatus are meant to be within the scope of the present invention.

After the PerspectiveOverlap routine returns a true or false value in step 33 of FIG. 8, the NearEnough routine returns the same corresponding value to the Rollup Service Routine in steps 34 or 35 of FIG. 8. Control is then returned to the Rollup Service routine at step 16 in FIG. 7. If the NearEnough routine returned a true (yes) value, then the newly created rollup object (NewRollupObject of the current loop iteration) may be deleted at step 17 in FIG. 7. The new rollup object may be deleted because it is "near enough" to an already existing rollup object. In this embodiment, there is no need to maintain this rollup 71 object as a separate rollup object. The pre-existing rollup object, to which the new one was near, provides the visual representation within the spatial definition for both objects. Once this rollup object has been deleted, the loop exits shown at step 18, with the command exit loop in the pseudocode.

In an alternative embodiment, instead of deleting the new rollup object at step 17, a more robust method for representing both the new and the pre-existing rollup object is implemented. For instance, at step 17, if both the new and pre-existing rollup objects have been determined to be "near enough" to each other to rollup, an entirely new, third rollup object may be created. This third rollup object may acquire traits of the two rollup objects which it will represent. The new, third rollup object for example may be positioned at an average distance between the location of the new and pre-existing rollup objects within the spatial area defined by RollupArea. By performing an averaging of the new and pre-existing rollup object positions, a more precisely positioned third rollup object will exist "in between" the locations of the two rollup objects combined. Each time another object is "added" to an already pre-existing rollup object, the position of the pre-existing rollup object may be altered in space to account for the additional object. The alteration may be based upon a center position average of the object being added into the rollup object, or may be based on a weighted average. A weighted average coordinate center position for a new rollup object takes into account the center points of all of the pre-existing rollup objects which have been represented by the current rollup object, as well as the center position of the new rollup object being "added into" the rollup. The center position for the new rollup object will be the average location of all center points of the other objects, as "seen" with respect to the perspective viewpoint position.

This "merging" of rollup objects based on averages is one example of the present invention's ability to distill multiple object representations into single, clearly defined rollup objects. In another example, color may be a characteristic of each rollup object. When a new rollup object is "merged" into an existing rollup object, the colors of the two objects may be combined for a new representative color. Also for example, icon symbols showing the contents of a rollup object may be changed, based on new rollup objects which are merged into the existing rollup object. These symbols may be graphically displayed on or within the rollup objects graphical perimeter on a computer display. Other processes known to those skilled in the art for averaging two object sets are meant to be within the scope of the present invention.

In the event that a newly created rollup object is not "near enough" to any other existing rollup objects to actually be rolled up, the loop checking for "closeness" (steps 15–19 in FIG. 7) will have been processed and the new rollup object (NewRollupObject) will not have been deleted. The next processing step of the Rollup Service routine, step 20 of FIG. 7, checks to see if the NewRollupObject still exists. If it does exist (because it was not "near enough" to another rollup object to get rolled into another other rollup object), then the RollupObjects.Add( NewRollupObject) routine is called. This corresponds to step 21 in FIG. 7. This routine adds the new rollup object to the currently existing set of rollup objects (SetOfRollupObjects). The entire process of steps 12–21 is repeated by selecting the next object (step 22) and returning to step 12. Upon returning to step 12, the next Object in the SetOfObjects is used.

At this point, the outermost loop, steps 12–22, is finished with the iteration for the current object. On the next iteration of the loop, the next object in ascending order (objects were sorted in step 11), from the original SetOfObjects will be used to repeat the entire process. All of the steps beginning with the description of the "for each Object in SetOfObjects" loop are repeated for every object in the spatial area RollupArea. After the last iteration of the loop which processes the last Object in SetOfObjects, all of the remaining objects are entered into the rollup set RollupObjects. At this point, the complete data structure RollupObjects comprises the rollup of all of the objects.

The above described rollup objects may be used in a network management software application to present different perspective views of network devices. The network devices may be positioned at various locations within a building structure for example, and the software can display the locations of the devices based on where they are located within the building. By performing a rollup view of network devices within the building, a more condensed view of the building's network architecture may be provided which is not dependent upon predefined relationships with the networking objects, as in the prior art.

Network management software applications allow remote management of networks and network devices using protocols which control devices on the network, such as the Simple Network Management Protocol (SNMP). An example of such a network management application is Spectrum Network Management System available from Cabletron Systems, Inc., Rochester N.H., USA.

Figure 10:
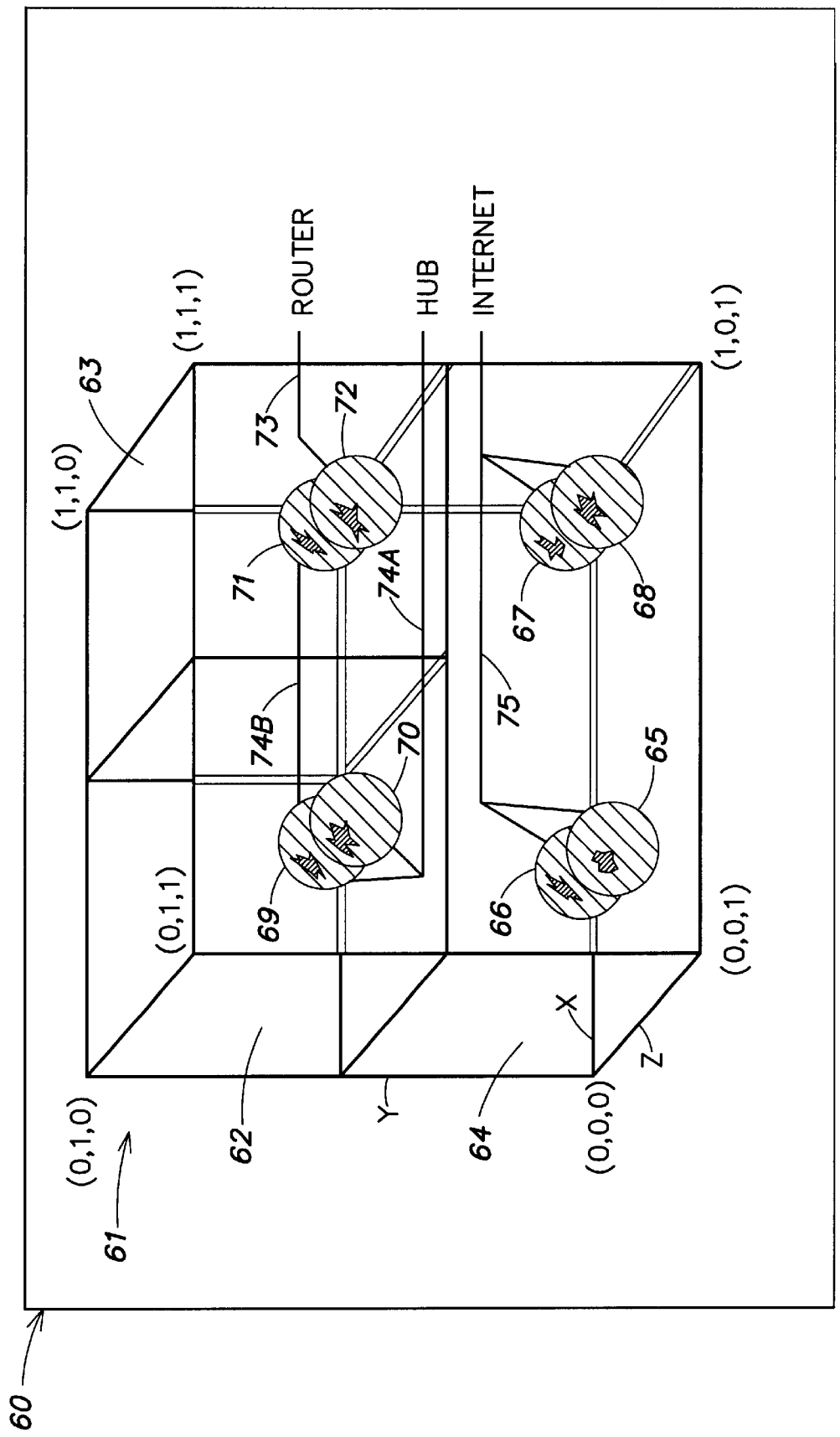
FIG. 10 is a display screen illustrating one perspective view of a set of objects.

FIG. 10 shows an example of a network manager's terminal display 60. The display is a layout of a portion of the network under control of the network management software. In FIG. 10, the software displays a portion of a network that exists in a building 61; the building is represented by solid and double lines (not labeled) and includes three rooms 62–64. The double lines show the boundaries of the rooms which exist "behind" the portions of the building in the foreground of the image; that is, the double lines represent the boundaries of areas of the building that would not be visible if the walls of the building were a solid color. In this example, the software displays the walls as being transparent, so that the contents of the rooms 62–64 are clearly visible.

In FIG. 10, managed network device icons 65–72 can be seen in each room 62–64 on the screen 60. The network device icons are shown as spheres, but may be displayed in other icon formats such as workstations, routers, hubs, etc., without deviating from the invention. Networking cables are shown as network lines 73–75 which connect the network devices. Networking line 75 represents a sub-network that connects each of the network devices represented by icons 65–68. In this example, networking line 75 is also labeled with the word "Internet" at the point where it appears to "exits" the right side of the building 61 in FIG. 10. This signifies to the network manager that the network devices, shown by icons 65–68, are also connected to the Internet computer network. Likewise, in room 62, network devices are represented by network device icons 69–70 and are connected to network line 74A. Network line 74A is labeled "HUB" at the point it exists the building 61 to symbolize connection to a hub device somewhere outside of the network in building 61. Device 71 in room 63 is connected to network device icon 69 by network line 74B. Thus, all three network devices, shown by icons 69–71, are connected to the same sub-network segment, 74A and 74B, of the network, which attaches to a hub. Finally, in room 63, network device icon 72 is connected to network line 73, which is labeled as "Router" at the point it "exists" the building 61.

The view presented to the network manager in display 60 of FIG. 10 is somewhat crowded and complex. This is due to the number of network device icons, network connections and rooms displayed by the network management software application. If other network devices were added to this image, the view may become confusing. Many objects (network device icons or other graphical images) may occlude other objects and it may become difficult to determine what type of network devices, and how many, are located at what locations within the building.

The present invention solves this problem by allowing the network manager to perform the rollup function as previously described. The network manager may enter a perspective value on which to base the roll up. This allows the network manager to "zoom in" and "zoom out" to different views of the building's network architecture. The rollup service may roll up the network devices as needed, based on the perspective viewpoint, the distance of this viewpoint from the building, the building space, the number of network objects which exist, their positional relationships with each other, and the manager's defined definition of "near".

Certain network management software applications, such as Spectrum, use a graphics engine to render three-dimensional objects and images of the network. The operator can then "rotate" the view of the building and its network objects in any direction in three dimensions on the screen to view the network structure from different perspective viewpoints. In such a network management application program, an almost infinite number of possible perspective views are permitted. Using the present invention, after the operator selects the perspective viewpoint, which may be any point having an X, Y and Z coordinate in the spatial area in or around the building, the rollup service may provide the correct rollup view of the network devices and network architecture based on the operator selected values. In effect, after the operator has selected a view, the rollup service aggregates together those graphical objects which are visually "near enough" to each other, as previously described, to provide a rollup image to the operator. The operator is thus presented with much less detail about the graphical objects, and can assimilate the overall graphic information more quickly.

Figure 11:
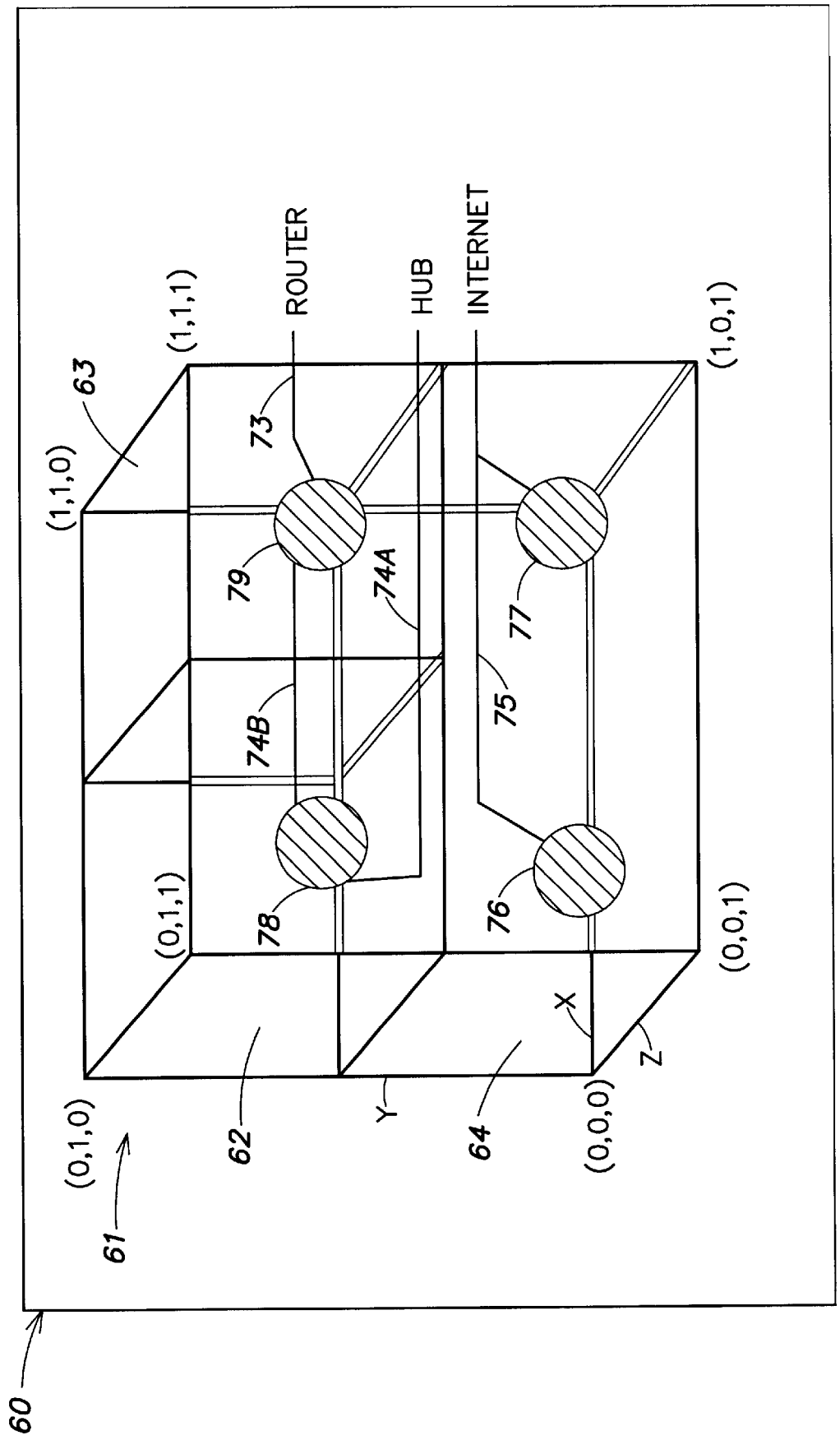
FIG. 11 is similar to FIG. 10 but showing a condensed set of rolled-up objects according to the present invention.

FIG. 11 shows approximately what a rollup of FIG. 10 may look like. In FIG. 10, network device icons 65, 68, 70 and 72 occluded network device icons 66, 67, 69 and 71, respectively. The pairs of network device icons which occluded each other have been rolled up into rollup icons 76–79 in FIG. 11. The rollup view provides a condensed view of the network device locations within the building 61. The rollup of the present invention in this example is not based upon the interconnectedness of any of the devices. The present invention uses the spatial relationship and perspective viewpoint of the network devices (objects) to perform the rollup. The viewpoint may be selected by the operator and may change constantly.

In this example, other graphical objects besides the network device icons were rolled up in FIG. 11. The networking lines 73–75, have been partially included in the rollup. In FIG. 10, the networking lines 74A and 75 split at their ends to connect to network devices 69 and 70, and 65 and 66, respectively. However, in FIG. 11, the split ends of network lines 74A and 75 have been combined in the rollup and are now represented by just one line to the rollup objects. The rollup service may thus treat each graphical object on the screen as a separate object when performing rollups.

In another embodiment of the present invention, network management software may depict the network architecture using a rollup at various perspective "altitudes". The altitudes are actually perspectives selected by the network manager. For example, Wide Area Networks (WAN's) may span large geographical areas. Some WAN's may consist of connections between many network devices located in many different buildings, areas, towns, cities, states, and countries, etc. Rollups according to the present invention may be used to effectively visualize the network architecture from various perspectives. The network manager may view the network architecture from its lowest level of detail to its highest level having more abstraction and less detail. An example of this embodiment, using various perspective views ("altitudes") of rollups of the network architecture, is shown in FIGS. 12–17.

Figure 12:
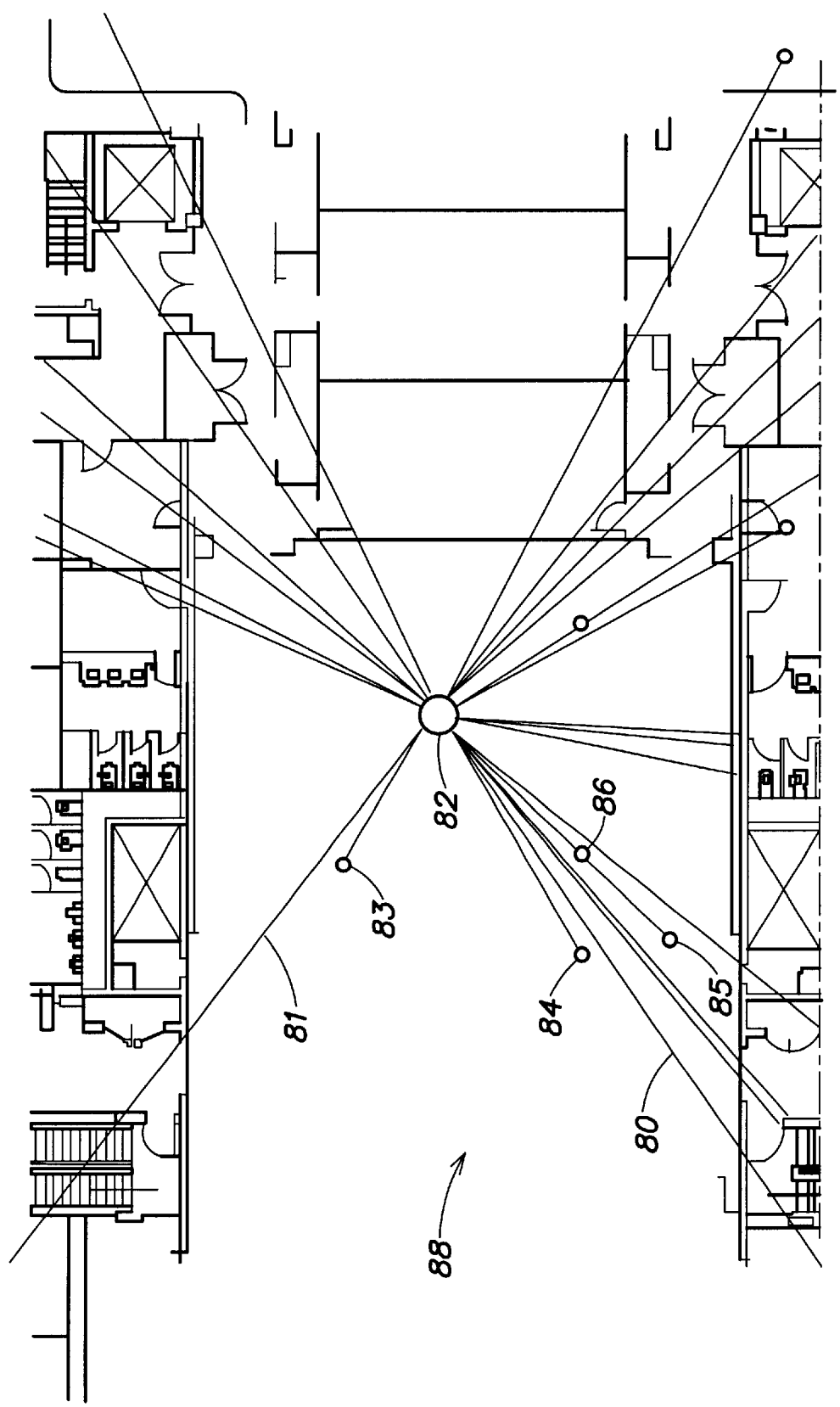
FIG. 12 is a display screen illustrating another perspective view of a set of objects according to the present invention.

In FIG. 12, an example view of a network architecture is shown, as displayed on the network manager's computer terminal. From this perspective, the network management software has drawn the network architecture for a particular room 88 within a building (not labeled). The graphical network architecture, including the placement of network devices 82–86, has been drawn over an image of a floor plan of one room 88 in the building. Portions of the surrounding areas of the room within the building are also shown. The network architecture connections are shown as a plurality of network connection lines, examples of which are labeled 80 and 81, extending from the centrally-located network device 82, which may represent a central file server for example, in room 88. Other network devices and connections are shown, not all of which are labeled.

Figure 13:
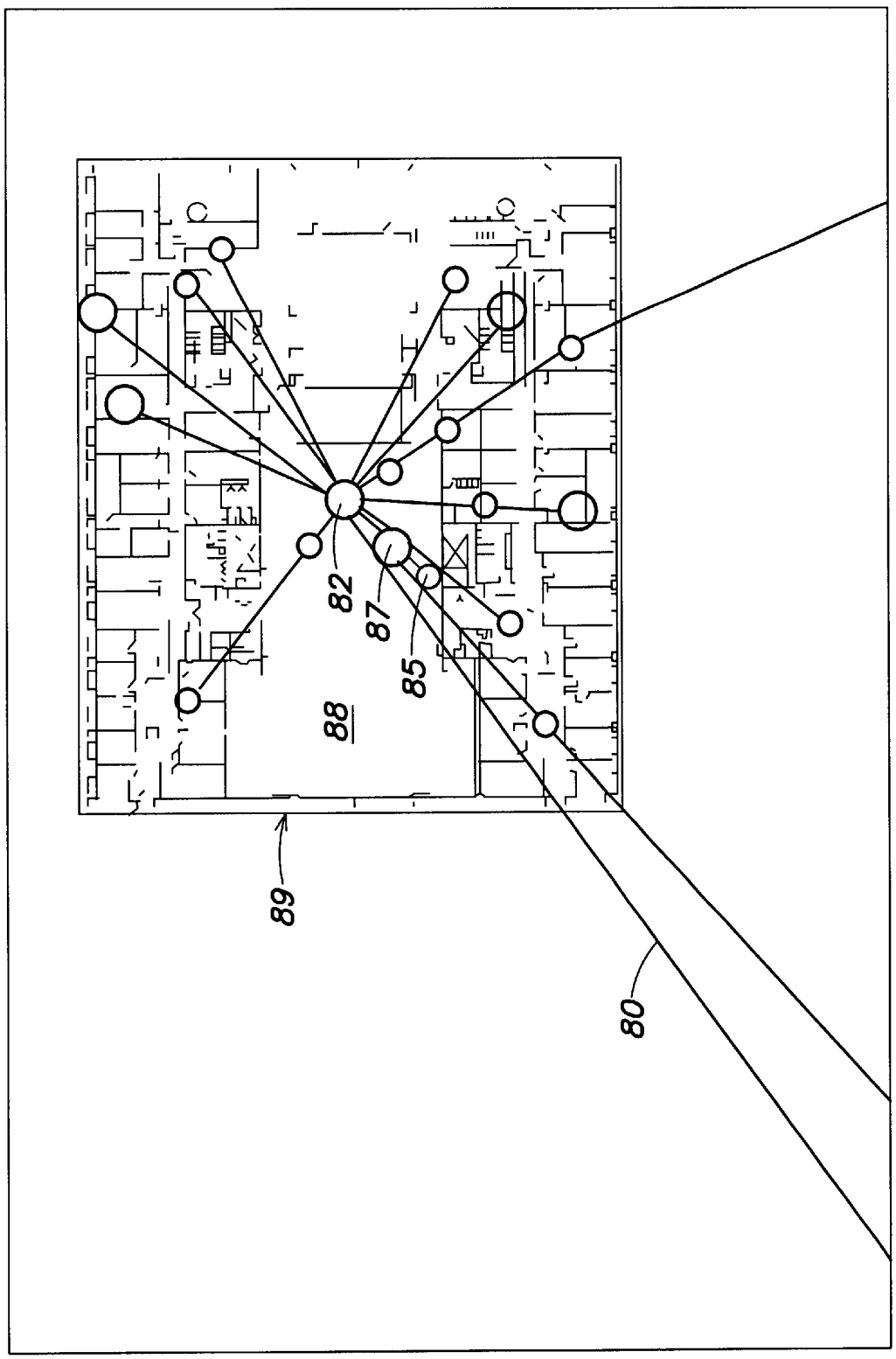
FIG. 13 includes the room view of FIG. 12, but from a different (further away) perspective, which includes certain rolled-up objects.

In this embodiment, if the network manager wants to see a bigger or broader picture of the network architecture, the perspective may be changed to create a rollup of the objects (network devices and connections) within FIG. 12. FIG. 13 shows an example of what the rollup of FIG. 12 may look like from a new perspective chosen by the network manager. In FIG. 13, an overview of the entire building's 89 network architecture may be seen. Network device 82 from FIG. 12 is still shown in the center of room 88, which is now seen near the center of the building 89. Other network devices, shown as large and small circles, may be seen within the building 89 as well. The number of devices shown by circles within room 88 in FIG. 13 is now less than the number in the same room 88 in FIG. 12. When the perspective was changed, a rollup of some devices occurred. For example, in FIG. 13 devices 84 and 86 are not shown.

The rollup service of the present invention has rolled-up network devices 84 and 86 into a single rollup network device icon 87 in FIG. 13. In this example, the rollup has been based upon the visually displayed graphical area of objects. When the perspective distance changed from one room in FIG. 10, to a whole building in FIG. 13, the rollup service was called. The rollup service determined that the graphical area of the network device objects would be "near enough" to be rolled up with each other, based on the newly selected perspective. Thus, the rollup service rolled up these objects and returned the proper set of objects to display. Another method, as previously described, may have been used to roll up the network device objects, such as the pixel relationship method. The point made is that the new presentation of objects is not based on former relationships between the objects, but rather is made based on the spatial relationships of the objects and the viewpoint of the objects.

The rollup network device icon 87 is larger than certain other network device icons in FIG. 13. This may alert the network manager to the fact that the network management software has rolled up more than one network device into the icon 87. Other sets of network devices (not labeled) within the building in FIG. 13 are likewise represented by large circles. The visual characteristics of the rollup icon can thus represent characteristics of the underlying individual objects, which the rollup object represents.

Figure 14:
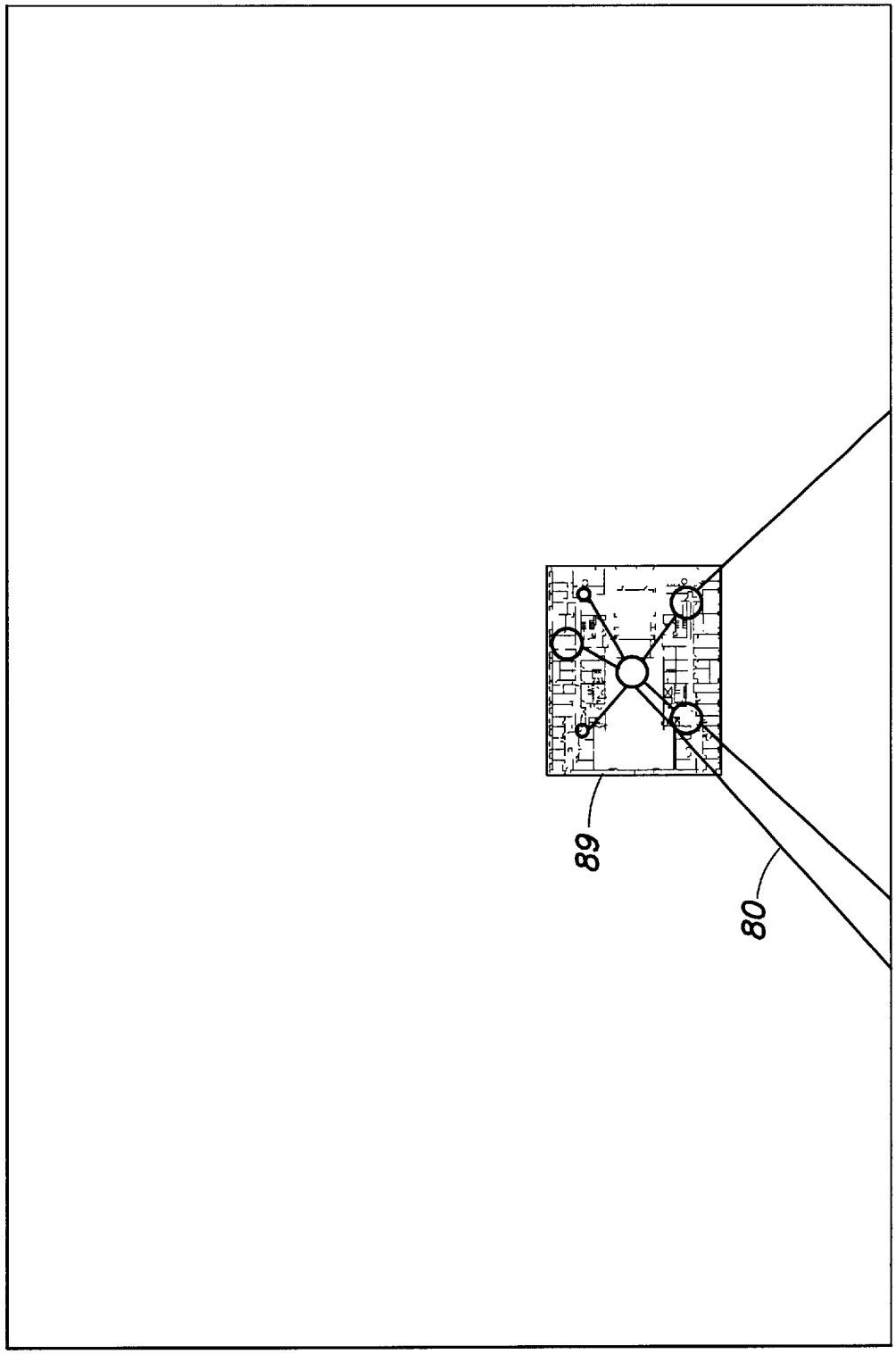
FIG. 14 is similar to FIG. 13, but taken from a still further away perspective.

If the network manager were concerned about devices and connections to the network outside of the boundaries of building 89, an even broader perspective can be chosen. For example, if the network manager wants to trace the network connection line 80, a broader perspective may be input to render a rollup such as that shown by FIG. 14. In FIG. 14, many of the network devices within building 89 have been rolled up into a few large circles within the building. Likewise, many of the network connection lines within the building have also been rolled up into combined network connection lines, i.e., network connections may be treated as objects by the rollup service, just like network devices. Also note that rooms have been condensed into a rollup of the building as well. From this new "higher" perspective however, the network manager still cannot determine where network connection 80 extends to.

Figure 15:
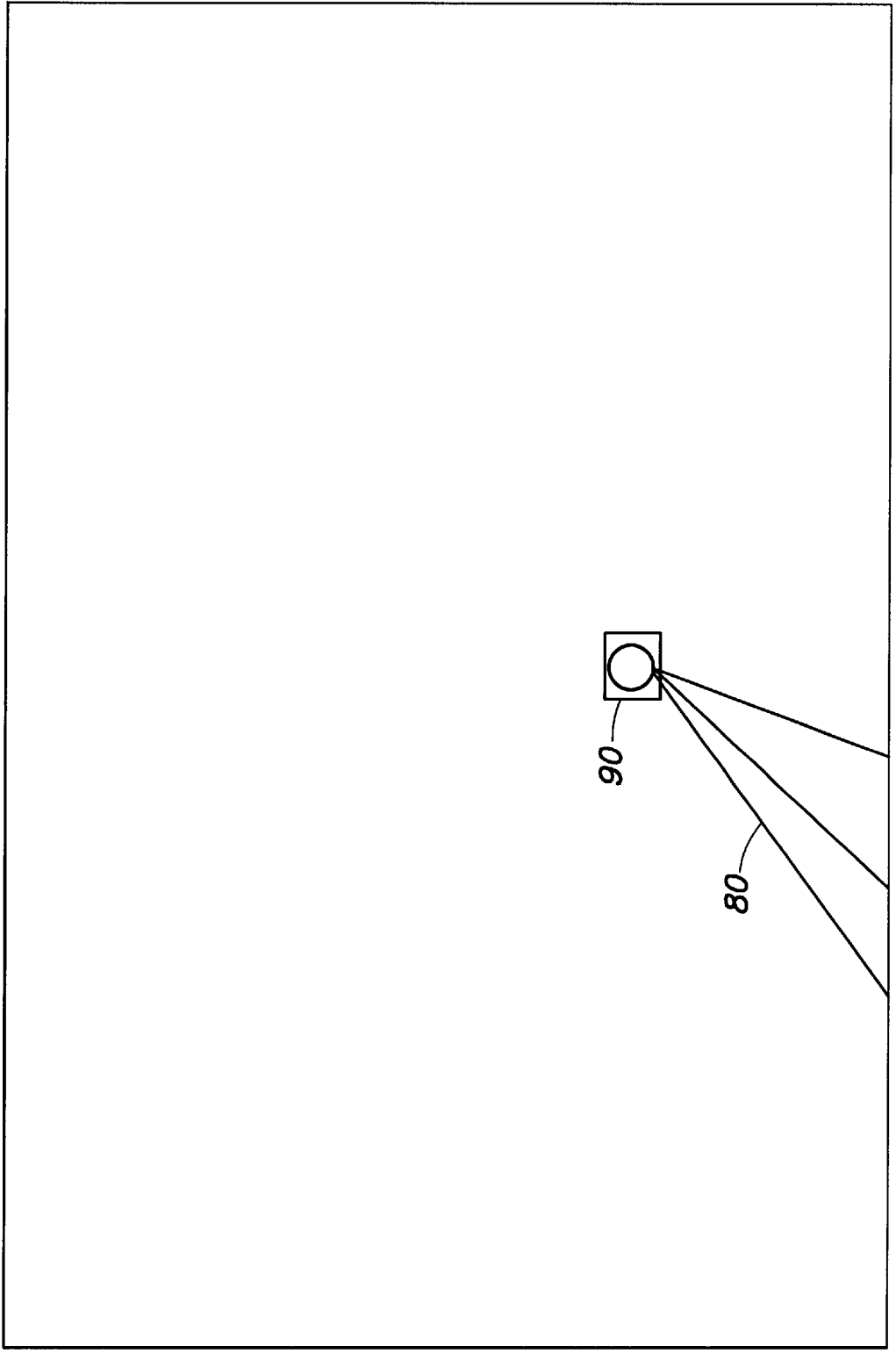
FIG. 15 is similar to FIG. 14, but taken from a still further away perspective.
Figure 16:
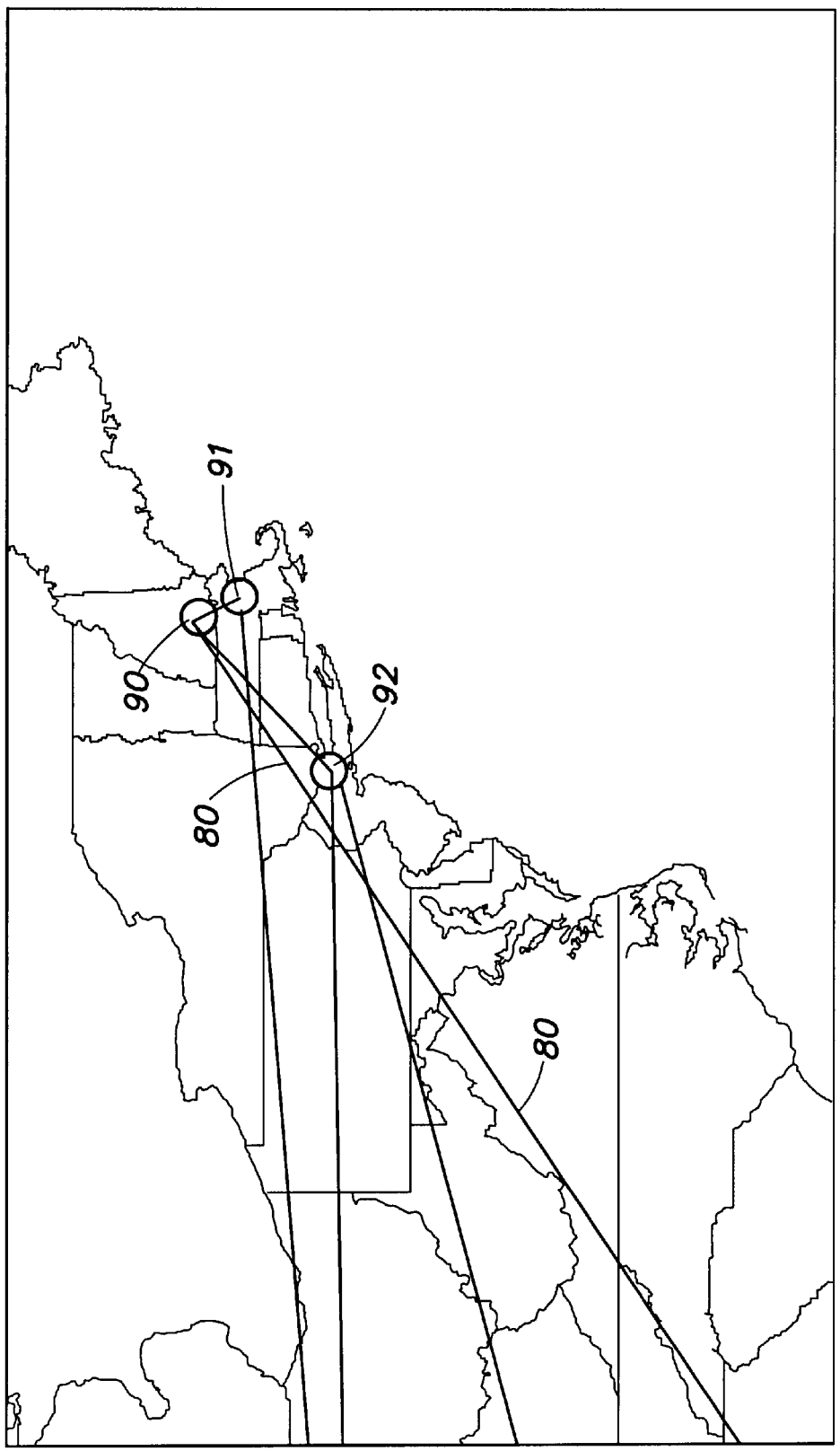
FIG. 16 is similar to FIG. 15, but taken from a still further away perspective, showing the Northeast United States geographical region.

By entering an even "higher" perspective, the network management application software may again use its rollup service to provide a view as shown in FIG. 15. In this figure, the entire network architecture contained within the building 89 from FIG. 14 has been rolled up into a single rollup icon 90 in FIG. 15. Once again however, network connection 80 extends beyond the view of this rollup, and an even "higher" perspective may be provided by the network manager. After entry of a new perspective, the application software may then present the rollup view of FIG. 16, which gives an overview of the Northeastern United States. From this perspective, the rollup icon 90 can now be seen to be located in southern New Hampshire, and thus represents the underlying network objects for southern New Hampshire. Furthermore, the cities of Boston and New York have rollup icons 91 and 92 displayed in their respective locations. These graphical rollup icons represent all of the network architecture and managed objects located within these areas.

Figure 17:
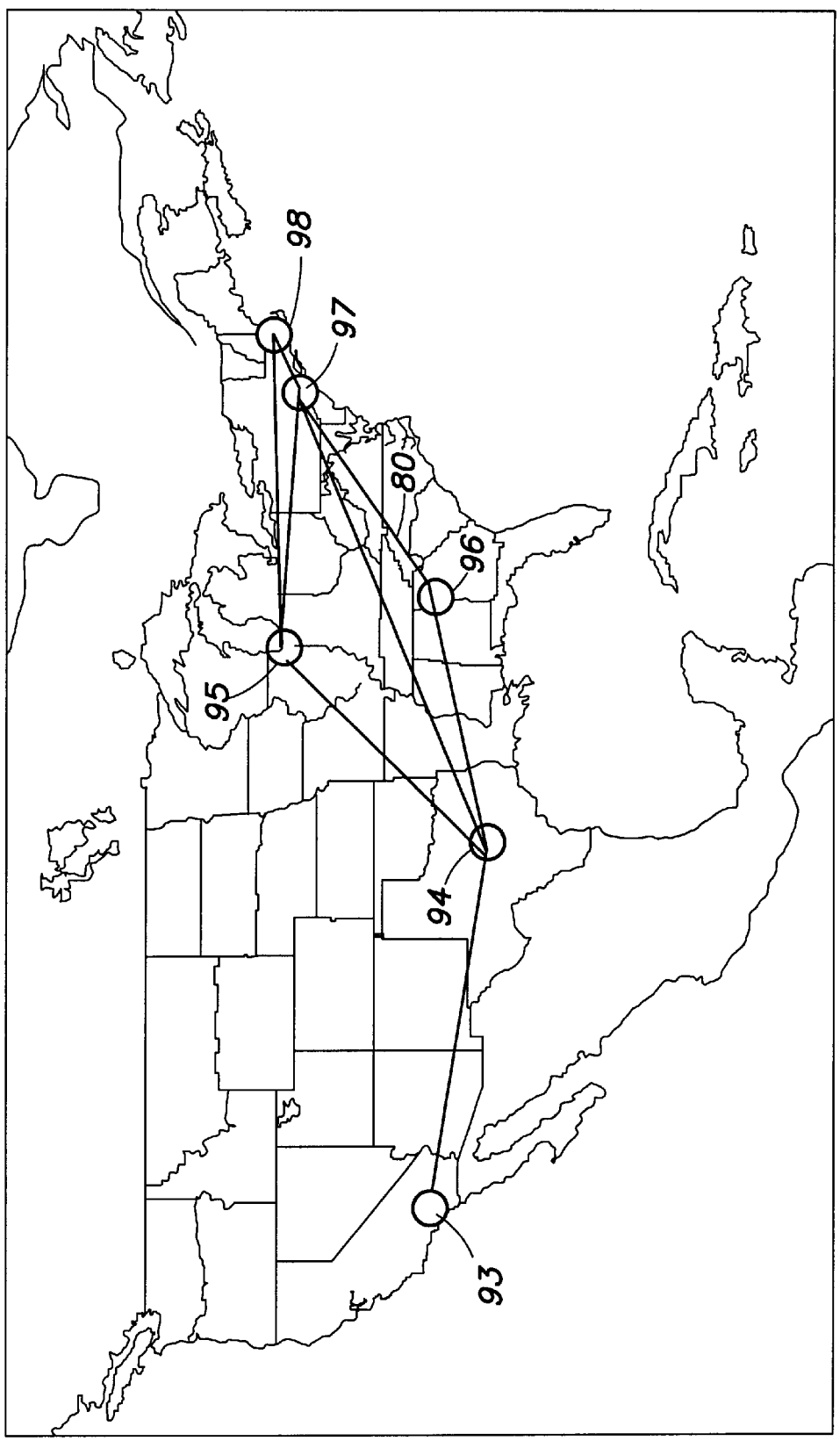
FIG. 17 is similar to FIG. 16, but taken from a still further away perspective, showing a map of the continental United States.

By adjusting the perspective one more time, a rollup view as shown by FIG. 17 may be presented. In this final view, various city locations indicated by rollup circles on the map of the United States of America are shown. The rollup circles indicate cities around the country where network devices are concentrated. The approximate location of the cities of: Redlands, CA93; Dallas/Forth Worth, TX94; Chicago, IL95; Atlanta GA96; New York, NY97; and Boston, MA98, each have a circle representing a rollup of the network architecture in those respective locations. Here Boston and Southern New Hampshire icons 90 and 91 from FIG. 16 have been condensed to a single icon 98. Network connections 80 show the connections between the various location icons.

Thus, the present invention provides a new method and apparatus which may condense the amount of information presented to a network manager regarding the computer network architecture and placement of objects. The network architecture view is determined based on the perspective of the viewpoint, the definition of the spatial area to be viewed (room, building, state, country, etc.), the positioning and size of the objects (network resources including devices, connections, applications, rooms, buildings, etc.) being viewed, and a definition of "nearness" selected by the viewer. The network manager may control the "definition of near" as previously described, by adjusting one or more parameters. The parameters for example may determine how many objects may be displayed in a rendered view, and how close they may be together, before they are rolled up together. The rollup mechanism provides a way to abstract the details of the network implementation which is useful in network management.

The present invention may also encompass the mechanisms by which an object's positional coordinates, object size, spatial definition and perspective data are actually obtained. For example, a user of a general purpose computer may enter object data into a data structure manually, or a program itself may identify objects and locations of objects based upon computations or upon predefined values. In another embodiment, software embodying the present invention may prompt the user to instruct the software where to obtain data relating to the objects, the space, and the perspective.

The present invention also represents functionality that may be tightly integrated into systems and software used for various purposes. For example, object and spatial information may be obtained from a database, or from another program running on the general purpose computer. The rollup service may be a subsidiary function of data management processing which presents a "cleaner" view for the representation of objects.

For example, a client system which contains all the data relating to the objects, space and perspective in data structures may call a rollup server system. The rollup server system would accept the parameters defining the various data needed to perform a rollup, and return the rollup of the objects to the client. The rollup server may be a process on the same computer, or may be on another computer coupled to a general purpose computer running a client program which is collecting data on the objects.

In another embodiment, the data relating to and describing the objects and spatial relationships could be obtained from real world measurements via an arrangement of devices which can detect positions of objects in a spacial area, such as a RADAR system or Global Positioning System (GPS). Such a system may then determine the physical location of objects (e.g., its coordinates), as well as the size and shape of the objects. The system could also determine its own perspective position in relation to the objects. Since RADAR or another distance measuring device may be used as the means for obtaining object, perspective and spatial data, the RADAR device which returns the object and spatial data may already present the objects in a closest to farthest away object order. Thus, when the Rollup Service routine is called to perform a rollup, sorting may not be needed in the rollup routine. Furthermore, in such a system, objects in space may be stationary or moving, i.e., the connectivity and location of network devices may change over time. When a rollup is desired for the objects, the object, spatial, and perspective data would be passed to the rollup server which performs the rollup for a snapshot instant in time. For objects that move, successive rollups could be compared to determine patterns in changes.

In a computer networking management environment, each object (network device, application, connection, etc.) may be able to determine its location independently. For example, before the computer network management software renders the image of a network architecture on the screen, the management software could query each managed device on the network for its location. This device location may be pre-programmed into the device at setup time, or, each device could determine its location independently. For example, each device on the computer network could be equipped with its own Global Positioning System indicator. The device could send its precise positional coordinates back to the computer network management station software over the computer network. If the network were rearranged at any time, each rendition of the network layout would show the changes in location of each device. The network management software may use pre-programmed information about a building's layout for example, as well as device location information, to render an accurate two or three-dimensional representation of the positional characteristics and connection relationships of network devices. The rollup mechanism could be used to condense this information, as shown in previous embodiments. Other methods of device location indication could use specific addressing schemes. The present rollup service may also enhance computer networks which have devices on moving assemblies that incorporate wireless data transmission. Since each devices location may be constantly changing, a rollup view of the network may condense information about device location and operation for a network manager. Those skilled in the art will observe that there may be many ways to obtain information relating to the size, placement and position of objects, including network and computer device objects, in a spatial area, as well as characteristics about the spatial area itself. These are within the scope of the present invention.

Many of the above embodiments may be implemented in a general purpose computer 50 as shown in FIG. 9. The computer may include all of the elements shown in this figure, or may not be limited to requiring all of these elements.

The invention may be a computer apparatus which performs the functions of any of the previous embodiments. Alternatively, the invention may be a memory 52 such as shown in FIG. 9, e.g., a floppy disk, compact disk, microchip, or hard disk drive, which contains a computer program or data structure, for providing to a general purpose computer instructions and/or data for carrying out the functions of the previous embodiments. Furthermore, any type of computer readable medium encoded with instructions to make a computer process information according to the previous embodiments is considered an embodiment within the scope of the present invention.

In yet another example, a large number of managed objects distributed in a logical space may be aggregated according to the present invention. An administrator, or administrator application, may need to report or display data for a large number of managed objects distributed in a logical space, such as time. The managed objects represent time-oriented managed objects of network devices or application services within the networked (managed) domain. For this example, assume that the time domain is defined as the duration of a week, multiple managed objects are managed over this domain (time), and the objects within the domain are time-oriented objects representing the managed objects in that logical space (i.e., at that time). This invention would take into account the spatial definition in the perspective, just as it did in the prior geographical spatial definition example. The area defined as the time domain "a week" and the perspective into that domain could be set such as "seeing the domain from a long time away", in which the objects would then be grouped into a single group which would then provide dynamic data for the objects in that spatial area (time domain). The perspective is could be set such as "seeing the domain from the center of the domain" and the objects would then be grouped into two groups (such as one for the early half of the week and one for the latter half of the week) which would then provide dynamic data for each of those groups based on the objects grouped within them.

Having now described various embodiments of the invention, numerous modifications will be apparent to one of ordinary skill in the art and are contemplated as falling within the scope of the invention as defined by the appended claims.

What is claimed is:

1. A system for condensing a visual representation of a plurality of network objects contained within an N-dimensional space, wherein N is an integer less than 4, and the network objects are object-oriented software objects that represent hierarchically-related resources in a computer network, the system comprising:

means for determining a perspective viewpoint of the plurality of network objects contained within the N-dimensional space; and means for producing a rollup object representing at least one of the plurality of network objects contained within the N-dimensional space based on a near enough relation of the network objects in the visual representation and the perspective viewpoint of the visual, said means for producing the rollup object comprising means for combining properties of the plurality of network objects represented by the rollup object to form properties of the rollup object.

2. The system of claim 1, wherein said means for producing a rollup object includes:

means for selecting each network object from the plurality of network objects in the N-dimensional space;

means for creating a new rollup object representing certain properties of the network objects selected by the means for selecting each network object;

means for determining if the new rollup object satisfies the near enough relation in the visual representation with at least one previously-created rollup object in a set of rollup objects, wherein the near enough relation is based on the perspective viewpoint and a proximity of the new rollup object in relation to the at least one previously-created rollup object; and means for combining properties of the new rollup object with properties of the at least one previously-created rollup object which satisfied the near enough relation.

3. The system of claim 1, wherein said means for producing a rollup object includes:

means for sorting the plurality of network objects in the visual representation of the N-dimensional space from a closest to a farthest away distance from the perspective viewpoint.

4. The system of claim 1, wherein said means for producing a rollup object includes:

means for sorting the plurality of network objects in the visual representation of the N-dimensional space from a farthest away to a closest distance from the perspective viewpoint.

5. The system of claim 2, wherein the near enough relation is based on a pixel relationship between the new rollup object and the at least one previously-created rollup object.

6. The system of claim 2, wherein the near enough relation is based on a threshold spatial distance relationship between the new rollup object and the at least one previously-created rollup object.

7. The system of claim 2, wherein the near enough relation is based on a perspective overlap area relationship between the new rollup object and the at least one previously-created rollup object.

8. The system of claim 1, wherein:

the network objects represent managed network devices in a computer network having connectivity relationships with other network devices and having properties representing parameters relating to a condition of the managed network device.

9. A computer-implemented process for producing in a visual representation a set of rollup objects from a set of network objects represented in an N-dimensional space, wherein N is an integer less than 4, and the network objects are object-oriented software objects that represent hierarchically-related resources in a computer network, the process comprising the steps of:

(a) selecting a rollup area within the N-dimensional space and a perspective viewpoint of the rollup area;

(b) selecting a network object from the set of network objects;

(c) determining if the selected network object exists within the rollup area;

(d) if the selected network object exists within the rollup area, then performing steps comprising:

(d1) creating a new rollup object for the selected network object, the new rollup object being an object-oriented software object having at least one property that relates to the selected network object;

(d2) determining if the new rollup object has a near enough relation to any other preexisting rollup object in a set of rollup objects as represented in the N-dimensional space and based on the perspective viewpoint, and if so, d3) aggregating the new rollup object created in step (d1) with the other preexisting rollup object which satisfies the near enough relation;

(e) repeating steps (b)–(d) for each network object in the set.

10. The computer-implemented process of claim 9, wherein:

the network objects represent managed network devices having connectivity relationships with other network devices and having properties representing parameters relating to a condition managed network device.

11. The computer-implemented process of claim 10, wherein step (d3) aggregates properties of the other rollup object with the new rollup object.

12. The computer-implemented process of claim 10, wherein step(d2) determines if the new rollup object is near enough to any other rollup object based on a threshold closeness distance in the visual representation computed for the new rollup object in relation to the other rollup object.

13. The computer-implemented process of claim 10, wherein step(d2) determines if the new rollup object is near enough to any other rollup object based on a pixel relationship for the new rollup object in relation to the other rollup object.

14. The computer-implemented process of claim 10, wherein step (b) includes a step of sorting the set of network objects based on a computed distance of each network object from the perspective viewpoint, wherein the step of sorting is performed before the step of selecting a network object from the set of network objects.

15. A product including a computer-readable medium with executable program logic stored thereon, wherein the computer program when executed comprises:

means for defining and representing in a visual representation an area of N-dimensional space, wherein N is an integer less than 4;

means for defining and representing in the visual representation a rollup area which comprises at least a portion of the space;

means for defining and representing in the visual representation a plurality of network objects within the rollup area, wherein each of the plurality of network objects are object-oriented software objects that represent at least one network resource;

means for defining and representing in the visual representation a perspective viewpoint of said plurality of network objects; and means for defining and representing a rollup object based on a nearness relationship for two or more network objects in the rollup area, the nearness relationship being based on a proximity threshold of the two or more network objects in the visual representation of the rollup area and the perspective viewpoint, wherein the rollup object is an object-oriented software object having attributes which are based on the two or more network objects which form the rollup object.

16. The product of claim 15, wherein the network objects represent one or more of computer devices, connections, and applications.

17. The product of claim 15, wherein the network objects are managed network objects of a network management software application.

18. The product of claim 15, wherein the means for defining and representing the nearness relationship is a dynamic function based on varying attributes of the network objects over time.

19. A process for producing a consolidated view of network objects, comprising steps of:

(a) selecting a perspective viewpoint for viewing a visual representation of an N-dimensional space containing a plurality of network objects, wherein N is an integer less than 4 and the network objects are object-oriented software objects that represent hierarchically-related resources in a computer network;

(b) processing data representing p locations of the network objects in the N-dimensional space to produce a consolidated view and forming at least one rollup object when the network objects satisfy a near enough relation of the network objects based on the perspective viewpoint and the locations of the network objects in the N-dimensional space; and (c) determining properties of the at least one rollup object by combining properties of the plurality of network objects to form properties of the at least one rollup object.

20. The process of claim 19, wherein the consolidated view is a geographical view of the locations of the network resources.

21. The process of claim 19, wherein the step of processing said data includes the steps of:

selecting a network object representing resources in a computer network;

22. A process for consolidating the visual representation of a plurality of hierarchically-related and managed computer network devices, comprising:

gathering positional data concerning a plurality of network devices interconnected via a computer communications network exiting in an N-dimensional space, wherein N is an integer less than 4;

determining a current visual representation of the plurality of network devices, based upon a current perspective viewpoint of the N-dimensional space and the positional data for the network devices;

displaying the current visual representation of the plurality of network devices;

determining a rollup object and a corresponding visual representation of the rollup object, the rollup object representing the plurality of network devices based upon a new perspective viewpoint and the positional data of the network devices in the visual representation, wherein the visual representation reflects how the plurality of network devices within the dimensions of the N-dimensional space would appear from the new perspective viewpoint;

determining properties of the rollup object by combining properties of the plurality of network devices to form properties of the rollup object; and displaying the visual representation of the rollup object.

23. A system for condensing a visual representation of a plurality of objects contained within an N-dimensional space, wherein N is an integer less than four, and each of the plurality of objects is an object-oriented software object, comprising:

means for determining a perspective viewpoint of the plurality of object contained within the N-dimensional space; and means for combining a plurality of rollup objects, each of which is an object-oriented software object and represents at least one of the plurality of objects contained within the N-dimensional space based on a near enough relation of the objects in the visual representation and perspective viewpoint of the visual representation such that the near enough relation eliminates overlap between the visual representation of the objects by determining if a second rollup object is within a predefined distance of a first rollup object so as to not warrant the existence of the first rollup object, wherein at least one property of the first rollup object is used to form a property of the second rollup object.

24. The system as claimed in claim 23, wherein the plurality of objects are network objects representing resources in a computer network and having hierarchical relationships with other network devices.

25. A system for condensing a visual representation of a plurality of network objects contained within an N-dimensional space, wherein N is an integer less than four and the network objects represent resources in a computer network, comprising:

means for determining a perspective viewpoint of the plurality of network objects contained within the N-dimensional space; and means for combining a plurality of rollup objects, each of which is an object-oriented software object and represents at least one of the plurality of network objects contained within the N-dimensional space based on a near enough relation of the network objects in the visual representation and the perspective viewpoint of the visual representation such that connectivity between the network objects is not used as a factor in producing the rollup, and wherein te near enough relation determines if a second rollup object is within a predefined distance of a rollup object so as to not warrant the existence of the first rollup object, wherein at least one property of the first rollup object is used to form a property of the second rollup object.

26. A system for condensing a visual representation of a plurality of objects contained within an N-dimensioned space, wherein N is an integer less than four, comprising:

means for determining a perspective viewpoint of the plurality of network objects contained within the N-dimensional space; and means for producing a rollup object representing the plurality of network objects contained within the N-dimensional space based on a near enough relation of the plurality of network objects in the visual representation and the perspective viewpoint of the visual representation;

means for combining properties of the plurality of network objects represented by the rollup object to form properties of the rollup object; and means for assigning additional properties to the rollup objects.

27. The system as claimed in claim 26, wherein the plurality of objects are network objects representing resources in a computer network and having hierarchical relationships with other network devices.

28. The system as claimed in claim 26, further comprising means for selecting each object from the plurality of network objects in the N-dimensional space;

means for producing a new rollup object representing certain properties of the object selected by the means for selecting each object; and means for assigning at least one additional property to the new rollup object.

29. The system as claimed in claim 1, wherein the network objects include the connectivity relationships with other network objects.

* * * * *